(12) United States Patent
Michel et al.

(10) Patent No.: US 12,135,443 B2
(45) Date of Patent: Nov. 5, 2024

(54) HOLOGRAPHIC PLASMA LENSES

(71) Applicant: Lawrence Livermore National Security, LLC, Livermore, CA (US)

(72) Inventors: Pierre Michel, Oakland, CA (US); Matthew Reid Edwards, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 217 days.

(21) Appl. No.: 17/200,688

(22) Filed: Mar. 12, 2021

(65) Prior Publication Data

US 2022/0291429 A1 Sep. 15, 2022

(51) Int. Cl.
| | | |
|---|---|---|
| *G03H 1/00* | (2006.01) | |
| *G02B 5/18* | (2006.01) | |
| *G02F 1/355* | (2006.01) | |
| *G03H 1/04* | (2006.01) | |

(52) U.S. Cl.
CPC .......... *G02B 5/1857* (2013.01); *G02F 1/355* (2013.01); *G03H 1/0402* (2013.01); *G03H 1/0465* (2013.01); *G03H 2001/0439* (2013.01); *G03H 2222/45* (2013.01); *G03H 2224/00* (2013.01)

(58) Field of Classification Search
CPC .... G02B 5/1857; G02F 1/355; G03H 1/0402; G03H 1/0465; G03H 2001/0439; G03H 2222/45; G03H 2224/00
USPC ................................................ 359/35, 30, 3
See application file for complete search history.

(56) References Cited

U.S. PATENT DOCUMENTS

| | | | | |
|---|---|---|---|---|
| 5,245,619 | A * | 9/1993 | Kronberg ........... | G02B 27/0988 372/98 |
| 5,307,184 | A * | 4/1994 | Nishiwaki ........... | G03F 7/70408 359/30 |
| 6,975,465 | B1 | 12/2005 | Chung et al. | |
| 2005/0271094 | A1 | 12/2005 | Miller et al. | |
| 2014/0340723 | A1 * | 11/2014 | Matsubara ........... | B42D 25/328 359/2 |
| 2015/0340835 | A1 | 11/2015 | Sridharan et al. | |
| 2017/0323757 | A1 | 11/2017 | Thaury et al. | |
| 2020/0025987 | A1 | 1/2020 | Tabirian et al. | |

OTHER PUBLICATIONS

International Search Report and Written Opinion for PCT Application No. PCT/US2022/019632 dated Jun. 28, 2022 in 12 pages.

(Continued)

*Primary Examiner* — Audrey Y Chang
(74) *Attorney, Agent, or Firm* — Knobbe, Martens, Olson & Bear, LLP

(57) ABSTRACT

A diffractive optical element, such as a holographic plasma lens, can be made by direction two laser beams so that they overlap in a nonlinear material, to form an interference pattern in the nonlinear material. The interference pattern can modify the index of refraction in the nonlinear material to produce the diffractive optical element. The interference pattern can modify the distribution of plasma for the nonlinear material, which can adjust the index of refraction. A third laser beam can be directed through the diffractive optical element to modify the third laser beam, such as to focus, defocus, or collimate the third laser beam.

23 Claims, 12 Drawing Sheets

(56) References Cited

OTHER PUBLICATIONS

Leblanc et al., "Plasma holograms for ultrahigh-intensity optics," Nature Physics 13 440-443 (2017).
Lehmann et al., "Plasma volume holograms for focusing and mode conversion of ultraintense laser pulses," Physical Review E 100, 033205-1 to -7 (2019).
Gabor, "A new microscopic principle," Nature 161 (1948).
Kirz, "Phase zone plates for x rays and the extreme uv," J. Opt. Soc. Am. 64, 301 (1974).
Sakdinawat et al., "Nanoscale x-ray imaging," Nature Photon 4, 840 (2010).
Milchberg, "Indestructible plasma optics," Phys. Today 72, 70 (2019).
Malkin et al., "Fast compression of laser beams to highly overcritical powers," Phys. Rev. Lett. 82, 4448 (1999).
Ping et al., "Amplification of ultrashort laser pulses by a resonant Raman scheme in a gas-jet plasma," Phys. Rev. Lett. 92, 175007 (2004).
Andreev et al., "Short light pulse amplification and compression by stimulated Brillouin scattering in plasmas in the strong coupling regime," Phys. Plasmas 13, 053110 (2006).
Edwards et al., "Short-pulse amplification by strongly-coupled stimulated Brillouin scattering," Phys. Plasmas 23, 083122 (2016).
Michel et al., "Tuning the implosion symmetry of ICF targets via controlled crossed-beam energy transfer," Phys. Rev. Lett. 102, 025004 (2009).
Glenzer et al., "Symmetric Inertial Confinement Fusion Implosions at Ultra-High Laser Energies," Science 327, 1228 (2010).
Lehmann et al., "Transient plasma photonic crystals for high-power lasers," Phys. Rev. Lett. 116, 225002 (2016).
Kirkwood et al., "Plasma-based beam combiner for very high fluence and energy," Nat. Phys. 14, 80 (2018).
Thaury et al., "Plasma mirrors for ultrahigh-intensity optics," Nat. Phys. 3, 424 (2007).
Mikhailova et al., "Ultra-high-contrast few-cycle pulses for multipetawatt-class laser technology," Opt. Lett. 36, 3145 (2011).
Michel et al., "Dynamic control of the polarization of intense laser beams via optical wave mixing in plasmas," Phys. Rev. Lett. 113, 205001 (2014).
Qu et al., "Plasma q-plate for generation and manipulation of intense optical vortices," Phys. Rev. E 96, 053207 (2017).
Turnbull et al., "Refractive index seen by a probe beam interacting with a laser-plasma system," Phys. Rev. Lett. 118, 015001 (2017).
Turnbull et al., "High power dynamic polarization control using plasma photonics," Phys. Rev. Lett. 116, 205001 (2016).
Wilson et al., "Ellipsoidal plasma mirror focusing of high power laser pulses to ultra-high intensities," Phys. Plasmas 23, 033106 (2016).
Krausz et al., "Attosecond physics," Rev. Mod. Phys. 81, 163 (2009).
Couairon et al., "Femtosecond filamentation in transparent media," Phys. Rep. 441, 47 (2007).
Crane et al., "Progress on converting a nif quad to eight, petawatt beams for advanced radiography," in J. Phys. Conf. Ser., vol. 244 (IOP Publishing, 2010) p. 032003.
Suntsov et al., "Femtosecond laser induced plasma diffraction gratings in air as photonic devices for high intensity laser applications," Appl. Phys. Lett. 94, 251104 (2009).
Shi et al., Generation of high-density electrons based on plasma grating induced Bragg diffraction in air, Phys. Rev. Lett. 107, 095004 (2011).
Durand et al., "Dynamics of plasma gratings in atomic and molecular gases," Phys. Rev. E 86, 10.1103/physreve.86.036405 (2012).
Michine et al., "Ultra high damage threshold optics for high power lasers," Commun. Phys. 3, 1 (2020).
Wood et al., "LIII. phase-reversal zone-plates, and diffraction-telescopes," Lond. Edinb. Dubl. Phil. Mag. 45, 511 (1898).
Sussman, "Elementary diffraction theory of zone plates," Am. J. Phys. 28, 394 (1960).
Rogers, "Gabor diffraction microscopy: the hologram as a generalized zone-plate," Nature 166, 237 (1950).
Woodbury et al., "Absolute measurement of laser ionization yield in atmospheric pressure range gases over 14 decades," Phys. Rev. Lett. 124, 013201 (2020).
Levashov et al., Analytical theory of zone plate efficiency, Phys. Rev. E 49, 5797 (1994).
Brabec et al., "Nonlinear optical pulse propagation in the single-cycle regime," Phys. Rev. Lett. 78, 3282 (1997).
Mlejnek et al., "Dynamic spatial replenishment of femtosecond pulses propagating in air," Opt. Lett 23, 382 (1998).
Arber et al., Contemporary particle-in-cell approach to laser-plasma modelling, Plasma Phys. Contr. F. 57, 113001 (2015).
M. R. Edwards, UltraFast Sources of Intense Radiation, PhD Thesis, Princeton University, 2019.
Off-Axis Parabolic Mirrors with Through Holes, Protected Gold, ThorLabs, Mar. 3, 2019.

\* cited by examiner

HOLOGRAPHIC PLASMA LENSES

FEDERALLY SPONSORED RESEARCH OR DEVELOPMENT

This invention was made with Government support under Contract No. DE-AC52-07NA27344 awarded by the United States Department of Energy. The Government has certain rights in the invention.

BACKGROUND

Field of the Disclosure

Some embodiments disclosed herein relate to holographic optical elements formed in a nonlinear medium, such as holographic plasma lenses.

Description of the Related Art

Although various lenses and other optical elements for manipulating a beam of light exist, there remains a need for improved optical elements, such as lenses for high power lasers that have a high laser damage threshold.

SUMMARY

Certain example embodiments are summarized below for illustrative purposes. The embodiments are not limited to the specific implementations recited herein. Embodiments may include several novel features, no single one of which is solely responsible for its desirable attributes or which is essential to the embodiments.

Some embodiments disclosed herein can relate to a system for making a diffractive optical element. The system can include at least one laser configured to provide first and second laser beams that are disposed with respect to each other and with respect to a nonlinear medium so that the first and second laser beams are configured to optically interfere and form an interference pattern on the nonlinear medium. The interference pattern can be configured to alter a characteristic of the nonlinear medium so as to produce a diffractive optical element that is configured to modify the propagation of a third laser beam transmitted therethrough. The interference pattern can be configured to modify the refractive index of portions of the nonlinear medium to produce the diffractive optical element. The system can be configured to provide or position the nonlinear medium at a location where the first and second laser beams at least partially overlap to form the interference pattern.

Some embodiments disclosed herein can relate to a system for making a diffractive lens. The system can include at least one laser configured to provide first and second laser beams, and a supply configured to provide a nonlinear medium. The first and second laser beams can be disposed with respect to each other and with respect to said nonlinear medium so that the first and second laser beams are configured to interfere and form an interference pattern on the nonlinear medium. The interference pattern can be configured to form a distribution of plasma from the nonlinear medium so as to produce a diffractive lens that is configured to modify the propagation of a third laser beam transmitted therethrough.

The nonlinear medium can include a gas jet. The at least one laser can include a first laser that is configured to produce the first and second laser beams. The first laser can be a pulsed laser. The first and second laser beams can include pulsed laser beams. The system can include a second laser that can be configured to produce the third laser beam. The second laser can be a pulsed laser, and the third laser beam can be a pulsed laser beam. The third laser beam can have a higher energy density than the first and second laser beams. The first and second laser beams can be collinear. In some embodiments, the third laser beam is not collinear with the first and second laser beams. The first laser beam, the second laser beam, and the third laser beam can be collinear. Any two of the first, second, or third laser beams can be collinear. Any two of the first, second, and third laser beams can be disposed at an angle such that at least two of the first, second, or third laser beams are not collinear. The first, second, and third laser beams are disposed at angles with respect to each other such that they are not collinear. The first and second laser beams can have the same wavelength. The diffractive lens can include a plasma lens. The diffractive lens can include a zone plate. The interference pattern is can be configured to alter the index of refraction of the nonlinear medium. The diffractive lens can be configured to produce multiple diffractive orders. The diffraction lens can be configured to provide a single diffractive order. The nonlinear medium comprises gas configured to be ionized by the first and second beams to form a plasma. The plasma can have a different index of refraction than the gas. The diffractive lens can be configured to provide a negative diffractive order. The plasma can have a light intensity dependent index of refraction. The interference pattern can produce concentric circles of plasma. In some embodiments, both the interference pattern and the plasma distribution comprise rings. The interference pattern and the plasma distribution can have the same pattern. A thickness of the nonlinear medium can be adjustable. The third laser beam can have an energy flux that is less than the ionization threshold of the nonlinear medium. The third laser beam can have an energy flux that is equal to or less than about $\frac{1}{10}$ the ionization threshold of the nonlinear medium. The first and second laser beams can include high intensity laser beams having an intensity of at least about at least about $10^{12}$ W/cm2. The third laser beam can include a high intensity beam having an intensity of at least about at least about $10^{12}$ W/cm2. The system can include a vacuum chamber.

Some embodiments disclosed herein can relate to a method for making a diffractive optical element. The method can include directing first and second pump laser beams to a nonlinear medium so that the first and second pump laser beams at least partially overlap each other in the nonlinear medium so that the first and second pump laser beams optically interfere to form an interference pattern at the nonlinear medium. The interference pattern can be configured to alter a characteristic of the nonlinear medium so as to produce a diffractive optical element. For example, the interference pattern can be configured to alter the index of refraction for portions of the nonlinear medium to produce the diffractive optical element.

Some embodiments disclosed herein can relate to a method for making a diffractive optical element. The method can include directing first and second pump laser beams to a nonlinear medium so that the first and second pump laser beams at least partially overlap each other in the nonlinear medium so that the first and second pump laser beams interfere to form an interference pattern at the nonlinear medium. The interference pattern can be configured to form a distribution of plasma from the nonlinear medium so as to produce a diffractive optical element.

The diffractive optical element can be transmissive. The method can include directing a probe laser beam through the diffractive optical element to modify propagation of the probe laser beam. Directing the probe laser beam through the diffractive optical element can focus the probe laser beam. Directing the probe laser beam through the diffractive optical element can collimate the probe laser beam. Directing the probe laser beam through the transmissive diffractive optical element can defocus the probe laser beam. The diffractive optical element can be a diffractive lens. The diffractive optical element can be a zone plate. The diffractive optical element can include plasma, which can include ionize gas. The diffractive optical element can be a plasma lens. The first and second pump laser beams can be directed to the nonlinear material along collinear paths. The interference pattern can alter the refractive index of the nonlinear material to produce the diffractive optical element.

Some embodiments disclosed herein can relate to a diffractive optical element, which can include a nonlinear material and a plurality of concentric plasma rings formed in the nonlinear material.

The diffractive optical element can be transmissive. The diffractive optical element can be a plasma lens. The nonlinear material can be a gas. The concentric plasma rings can be separated by regions of non-ionized gas. The index of refraction can vary between the plasma and the nonlinear material. The diffractive optical element can include a zone plate.

BRIEF DESCRIPTION OF THE DRAWINGS

Certain embodiments will be discussed in detail with reference to the following figures, wherein like reference numerals refer to similar features throughout. These figures are provided for illustrative purposes and the embodiments are not limited to the specific implementations illustrated in the figures.

DETAILED DESCRIPTION OF CERTAIN EMBODIMENTS

Figure 1:
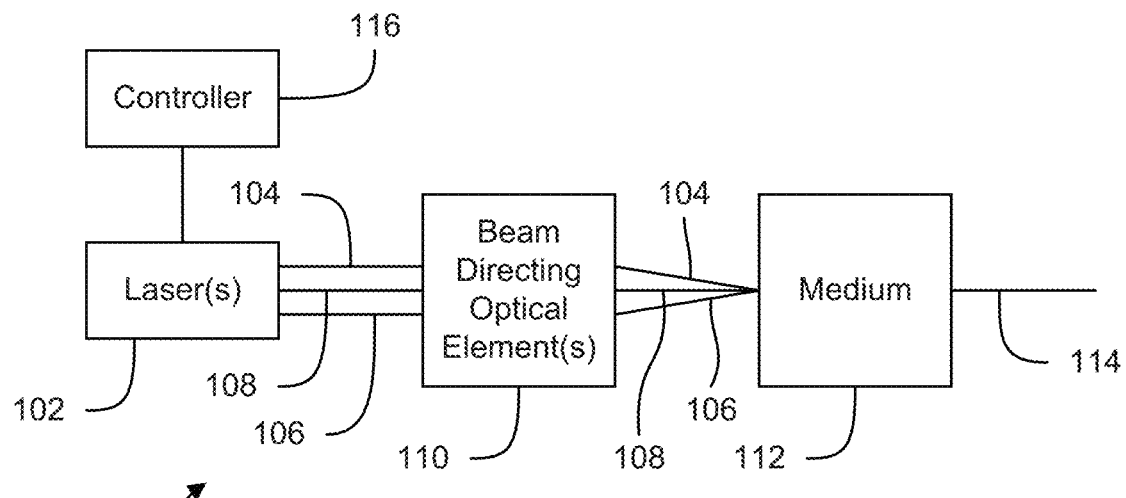
FIG. 1 shows an example embodiment for a system for making an optical element.

The various features and advantages of the systems, devices, and methods of the technology described herein will become more fully apparent from the following description of the examples illustrated in the figures. These examples are intended to illustrate the principles of this disclosure, and this disclosure should not be limited to merely the illustrated examples. The features of the illustrated examples can be modified, combined, removed, and/or substituted as will be apparent to those of ordinary skill in the art upon consideration of the principles disclosed herein.

Lenses and other optical elements can be formed from glass, polymers, or other materials that can be damaged by high intensity light, such as from high power lasers. In some instances, large sized lenses or other optical elements can be made of glass, or other suitable materials, to spread the power over a large area to avoid or reduce damage from high powered light. However, the large size of the optical elements can be incompatible with some system, and the large optical elements can be prohibitively expensive, especially for very high power applications.

Some embodiments disclosed herein can create an optical element (e.g., a lens) from plasma, which can be less susceptible to damage from high intensity light as compared to glass and many other optical materials. In various implementations, for example, two pump laser beams can be directed so that they overlap in a nonlinear medium. This nonlinear medium may have an index of refraction that varies with the intensity of light incident thereon, for example, when such intensities are sufficiently high. The nonlinear medium may comprise, for example, gas that may in some cases be ionized. Accordingly, in various implementations, the pump beams may be directed into gas, or a gas stream, or a gas jet. The term gas jet can refer to the gas itself, which can be a stream of gas, which can be emitted from a nozzle or other device. The two pump laser beams can optically interfere with each other, and can produce an interference pattern in the nonlinear medium such as in the gas. Without subscribing to any particular scientific theory, in some cases, for example, the interference pattern can produce spatially variant ionization (SVI) in the gas, with areas of constructive interference having more plasma (e.g., less neutral gas) and with areas of destructive interference having less plasma (e.g., more neutral gas). The ionized gas of the plasma can have a lower index of refraction than the non-ionized gas (e.g., neutral gas), so that the interference pattern can produce variability in the index of refraction in the medium. In some cases, the interference pattern can produce ponderomotively-forced plasma density fluctuations that create variations in the index of refraction in the nonlinear medium. For example, ions, charged particles, can move based on the gradient in electric field created by the higher and lower intensity light in the interference patter. Other mechanisms for producing an interference pattern variations in the index of refraction within the nonlinear medium are possible. Any suitable medium can be used in which the index of refraction can vary depending on the intensity of light, so that the interference pattern between the two pump beams can modify the index of refraction across the medium. However, as discussed above, a nonlinear medium comprising a plasma may have the advantage of providing a higher damage threshold than other mediums. Having the ability to withstand high intensity can thus make such plasma based optical elements, e.g., plasma lenses, useful for high power lasers and laser systems.

In use, a probe laser beam can be directed through the medium and the variations in the index of refraction can modify the probe laser beam, for example, focusing, defocusing, or collimating the probe laser beam. Accordingly, some embodiments disclosed herein can relate to methods and systems for creating and using lenses, such as plasma lenses. The interference between the pump beams can produce variations in the index of refraction in the medium to produce a zone plate (e.g., a plasma zone plate), or other diffractive pattern. The resulting zone plate can diffract the probe beam and can focus, defocus, or collimate the probe beam. (The term zone plate such as Fresnel zone plate applies in various cases described herein even where the medium is not rigid. For example, the zone plates formed in plasma and/or gas may not be rigid like glass but are nevertheless referred to herein as a zone plate.) Thus, some embodiments disclosed herein can relate to systems and methods for creating and using diffractive optical elements or holographic optical elements, such as diffractive lenses or holographic lenses. In some implementations, the interference pattern can produce a diffractive plasma lens or holographic plasma lens, which can be capable of focusing, defocusing, or collimating light. Holography can encode a three-dimensional light field by imprinting an interference pattern in a nonlinear medium. Accordingly, a desired operation on a beam, such as focusing or collimating can be achieved, (however, the holograph can be used to operate on probe beams that are different than the pump beam in some instances.) The two pump laser beams, which may comprise beams of pulses from a pulsed source such as a pulsed laser, that overlap in the medium (e.g., gas) can record a hologram. The hologram may comprise a varying distribution of plasma. The hologram produced by the interference can be used to manipulation a subsequent probe beam of light, for example operating as a lens or diffractive optical element. For example, the hologram may be a zone plate that operates as a lens on a probe beam. Some embodiments disclosed herein can relate to systems and methods for creating and using holographic optical elements, such as holographic lenses, which can be holographic plasma lenses in some cases. As discussed herein, in some implementations, the optical elements (e.g., plasma lenses) disclosed herein can withstand high energy density probe laser beams that could damage glass and other solid-state optical materials.

FIG. 1 shows an example embodiment of a system 100 for producing an optical element (e.g., a transmissive optical element), such as a plasma lens. The system 100 can include one or more lasers 102 configured to produce a first pump laser beam 104, a second pump laser beam 106, and a probe laser beam 108. The system 100 can include one or more optical elements 110, which can be configured to direct the laser beams 104, 106, 108 to a medium 112, which can be a nonlinear medium. The medium 112 can be a gas, a plasma, a liquid, a solid, or any other suitable material that at can produce a change in the index of refraction that depends on the intensity of light. The one or more beam directing optical elements can direct the first pump laser beam 104 and the second pump laser beam 106 so that they overlap each other in the nonlinear medium 112, which can produce an interference pattern in the medium 112. The interference pattern can produce a variable distribution of plasma, and therefore variable indices of refraction in the medium 112. The probe laser beam 108 can be directed to the medium 112 with the varying index of refraction to modify (e.g., to focus or collimate or diffract) the probe laser beam 108. The system 100 can produce a modified (e.g., focused, defocused, collimated, or diffracted, etc.) probe laser beam 114 can exit the medium 112.

In some embodiments, the one or more lasers 102 can be configured to produce laser pulses for the first pump laser beam 104, the second pump laser beam 106, and/or the probe laser beam 108. The one or more lasers 102 can include one or more femtosecond lasers or one or more picosecond lasers, although any suitable laser(s) can be used. The plasma lens can be produced using femtosecond laser pulses, although picosecond laser pulses could be used, or laser pulses of any suitable duration. Although the variable index of refraction in the medium 112 (e.g., produced by the variable distribution of plasma) can be transient, it can persist long enough for the probe laser beam 108 to propagate through the medium 112 so that the light of the probe laser beam 108 is modified.

In some embodiments, one laser is used to produce both the first pump laser beam 104 and the second pump laser beam 106, which can facilitate the delivery of both pump laser beams 104, 106 to the medium 112 at the same time, especially for short duration laser pulses. The same laser that makes either or both of the pump laser beams 104, 106 can also produce the probe laser beam 108. For example, the laser can be configured to produce lower intensity pulses for the pump beams 104, 106 and a higher intensity pulse for the probe beam 108. In other embodiments, a first laser can be used to make the pump laser beams 104, 106 and a second laser can be used to produce the probe laser beam 108, or three different lasers can be used to make the beams 104, 106, 108. Also, in some cases a first and second lasers can used to provide the first and second laser beams 104, 106, respectively. In some implementations, the pump laser beams 104, 106 can have the same wavelength. The probe laser beam 108 can have the same wavelength as the pump beams 104, 106 in some embodiments, but a different wavelength can be used for the probe beam 108 in some cases as well.

The system can include a controller 116, which can be configured to control the one or more lasers 102, so as to produce the laser pulses for the pump beams 104, 106 and the probe beam 108 at the suitable times so that the pump beams 104, 106 are present in the medium 112 at the same time, and/or so that the probe beam 108 is directed through the medium 112 while the plasma lens is present. The controller 116 can include a processor, which can be configured to execute instructions, which can be stored in memory, to implement features disclosed herein.

The one or more optical elements 110 for directing the light beams 104, 106, 108 can include one or more mirrors, lenses, beam splitters, beam combiners, etc. The optical elements 110 can change the direction of propagation and/or the focal length of the pump laser beams 104, 106. In some embodiments, the optical elements 110 can produce collinear pump laser beams 104, 106, which can propagate in the same direction, can have different focal lengths, and can overlap each other in the medium 112. In some embodiments, the probe laser beam 108 can be collinear with the first pump laser beam 104 and/or the second pump laser beam 106. For example, the pump laser beams 104, 106 and the probe beam 108 can be collinear and can propagate in the same direction. Alternatively, the pump laser beams 104, 106 and the probe beam 108 can be counter-propagating, with the probe laser beam 108 propagating through the medium 112 in the opposite direction as the pump laser beams 104, 106. The probe beam 108 can propagate directly to the medium from the laser. In some embodiments, the one or more beam directing optics 110 do not affect the probe beam 108, which can be beneficial for high intensity probe beams 108.

In some embodiments, a laser beam (e.g., comprising laser pulse(s)) can be split (e.g., using a beam splitter) to produce the two pump laser beams 104, 106. A beam combiner can combine the two pump laser beams 104, 106, such as along a collinear path. The two pump laser beams 104, 106 can propagate along different paths (e.g., between the beam splitter and the beam combiner), and the different paths can have different focusing optics (e.g., one or more lenses or focusing mirrors), which can impart different focal lengths to the two pump laser beams 104, 106. In some instances, glass beam splitters and/or beam combiners are not used due to the high intensity of the pump laser beams 104, 106 and/or the probe beam 108.

Figure 2:
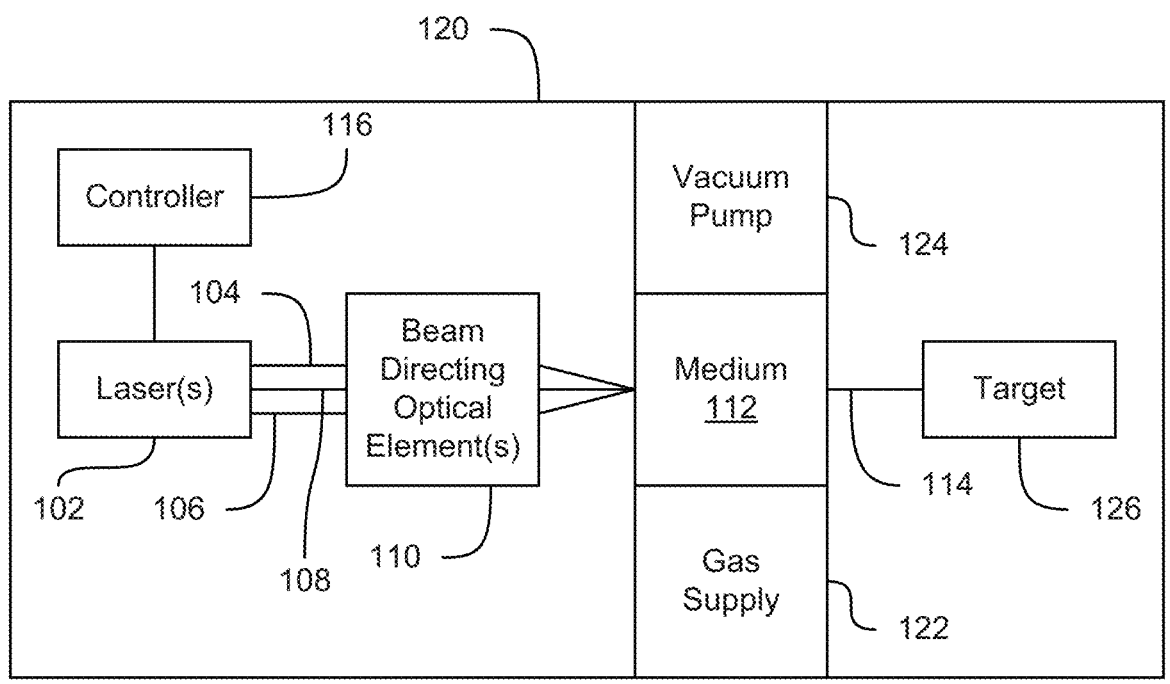
FIG. 2 shows another example embodiment for a system for making an optical element.
Figure 2A:
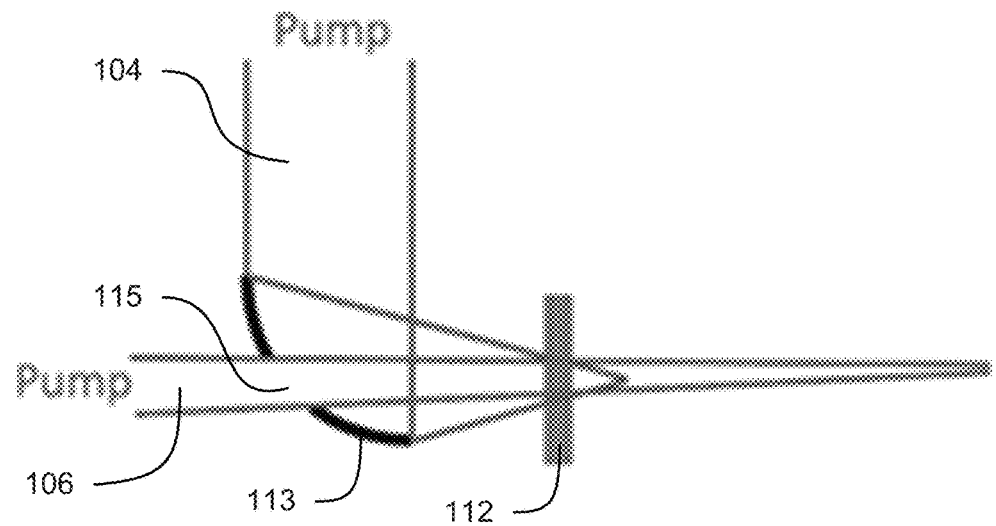
FIG. 2A shows an example embodiment of first and second pump beams being directed to a medium.

With reference to FIG. 2A, in some embodiments, a mirror (e.g., focusing mirror 113) can reflect the first pump beam 104 along a path toward the medium 112. The focusing mirror 113 can focus the first pump beam 104 to have a first focal length, but other mirrors can output a collimated or diverging pump beam 104 toward the medium 112 in other designs. The mirror 113 can be curved, such as to impart optical power on the pump beam 104, or the mirror 113 can be flat, such as to merely redirect the pump beam 104. The mirror 113 (e.g., focusing mirror) can have an aperture 115, which can be located in the middle of the mirror 113 or any other suitable location. The second pump beam 106 can pass through the aperture 115 so that the second pump beam 106 is directed to the medium 112 along the same path as the first pump beam 104, but with a different focus or focus location or focal length (e.g., that is longer than the focal length of the first pump beam 104 or wherein the focus position is farther or the beam converging at a less steep angle). A different focusing mirror or other optics (not shown in FIG. 2A) can reflect or otherwise direct the second pump beam 106 to propagate through the aperture 115 and/or focus the second pump beam 106 to have a focal length. In some embodiments, the second pump beam 106 could be collimated or could be diverging when it propagates through the medium 112.

Figure 2B:
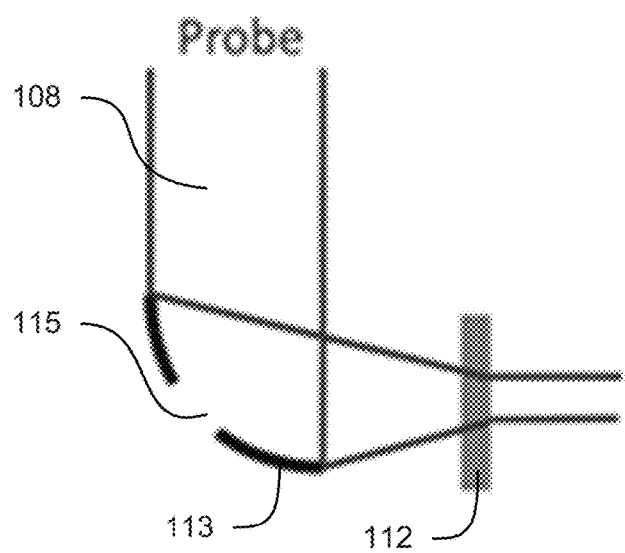
FIG. 2B shows an example embodiment of a probe beam being directed to a medium.

As shown in FIG. 2B, in some embodiments, the probe beam 108 can be reflected toward the medium by the same mirror 113 as the first pump beam 104. The mirror 113 can be a focusing mirror that focuses the probe beam 108. In some embodiments, the pump beam 104 and the probe beam 108 have different wavelengths, and a dichroic mirror can be used so that both the pump beam 104 and the probe beam 108 are directed to the mirror 113 (e.g., along collinear paths). In some embodiments, the pump beam 104 and the probe beam 108 can have the same wavelength and different polarizations can be used for the pump beam 104 and the probe beam 108, so that a polarization-dependent optic can be used to combine the optical paths of the pump beam 104 and the probe beam 108. Other arrangement can be used to introduce the probe beam. Although not illustrated, the probe beam 108 could be reflected toward the medium 112 by the same mirror as the second pump beam 106. If the probe beam 108 and the pump beam 104 are both collimated when they hit the focusing mirror 113, then the pump beam 104 and the probe beam 108 will have the same focus location and/or distance as they propagate towards the medium 112. In some embodiments, the probe beam 108 is not collimated before it is reflected by the mirror 113. The focus location of the probe beam 108 can be moved, such as by sending the probe beam 108 through a lens (e.g., a weak lens) before combining the paths of the probe beam 108 and pump beam 104.

The probe beam 108 can have a different wavelength of light as compared to the pump beams 104, 106, and in some configurations the optical elements 110 can operate differently on the light of different wavelengths so that the probe beam 108 can originate at a different location from the pump beam 104, 106 and can be redirected to be collinear with one or both of the pump beams 104, 106. In some embodiments, a lens can be used to direct the pump beam 104 and the probe beam 108 to the medium 112. The lens can also change the focus of the pump beam 104 and the probe beam 108. The pump beam 104 and the probe beam 108 can have different wavelengths so that the lens acts differently on the light of different wavelengths for the pump beam 104 and the probe beam 108. Thus, the pump beam 104 and the probe beam 108 can approach the lens from different angles (e.g., originating from different locations, such as from different lasers), and the pump beam 104 and the probe beam 108 can exit the lens along collinear paths. In some embodiments, a turning prism can be used to turn the pump beam 104 and probe beam 108 by different amounts when different wavelengths are used for the pump beam 104 and probe beam 108, so that the paths of the pump beam 104 and the probe beam 108 can be combined from different directions (e.g., from different lasers) to collinear paths. The lens or prism can have an aperture similar to the aperture 115 to permit the other pump beam 106 to pass through the lens or prism and propagate toward the medium 112 along the same collinear path as the pump beam 104 and/or the probe beam 108. Alternatively, the lens or prism can combine the optical paths of the pump beam 104 and probe beam 108 before the focusing mirror 113.

In some embodiments, the probe beam 108 can be non-collimated (e.g., already converging or diverging) when introduced onto the same path as the pump beam 104. After being reflected by the mirror 113, the pump beam 104 and probe beam 108 can have different focal spots. In some configurations, the probe beam 108 can have the same wavelength as the pump beams 104, 106 and the same focus (e.g., focal length or distance) as the pump beam 104. This configuration can cause the plasma optic (e.g., the holographic plasma lens) to focus the light of the probe beam 108 at the focal spot of the second pump beam. The pump beams 104, 106 can produce a plasma hologram, and the probe beam 108 with parameters similar to one of the pump beams 104 can be input to the hologram in order to output a beam with parameters similar to the other pump beam 106, using the principles of holography. In some cases, this approach can yield high levels of efficiency, as discussed herein. In some embodiments, the probe beam 108 can have a wavelength different from the pump beams 104, 106 and/or focus properties that are different from the pump beams 104, 106, so that the plasma optic can focus probe beam to a focal spot that is different from the focal spots of the pump beams 104, 106.

In some configurations disclosed herein, the probe beam 108 can interact with one or more optical elements 110, such as the mirror 113, a lens, or a prism. Those optical elements can include glass or other solid-state optical materials. However, before the probe beam 108 is focused (e.g., by the focusing mirror 113), the diameter of the probe beam 108 can be sufficiently large that the light of the probe beam 108 can be spread over areas of the optical elements 110 that is large enough that the optical elements 110 are not damaged. In some configurations, the optical elements 110 are exposed to much less intensity of the light of the probe beam 108 as compared to the plasma optic, because the light is spread out over a larger area.

Figure 2C:
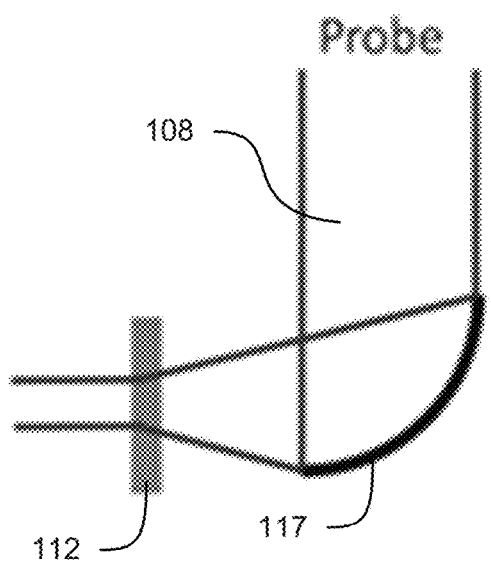
FIG. 2C shows another example embodiment of a probe beam being directed to a medium.

With reference to FIG. 2C, in some embodiments, the probe beam 108 can propagate toward the medium 112 in a direction that is opposite to the direction by which one or both of the pump beams 104, 106 approach the medium 112. The probe beam 108 can be collinear with, but opposite to, the pump beam 104 and/or the pump beam 106. A mirror 117 can reflect the probe beam 108 so that it approaches the medium 112 from a different (e.g., opposite) direction than the pump beams 104, 106. The mirror 117 can be a focusing mirror that can focus the probe beam towards a focal location.

Figure 2D:
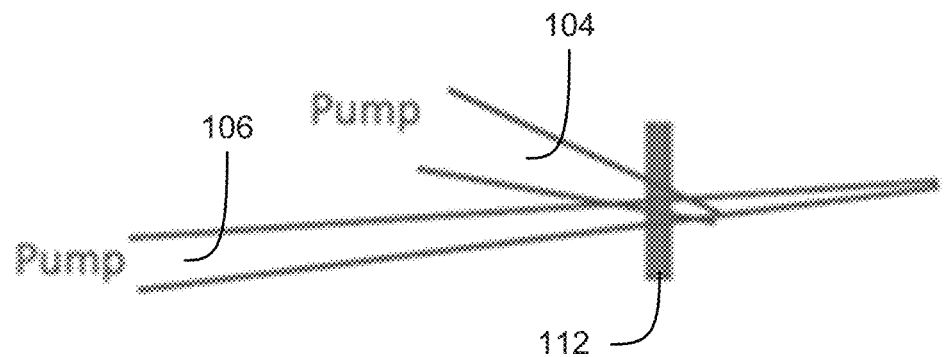
FIG. 2D shows another example embodiment of first and second pump beams being directed to a medium.
Figure 2E:
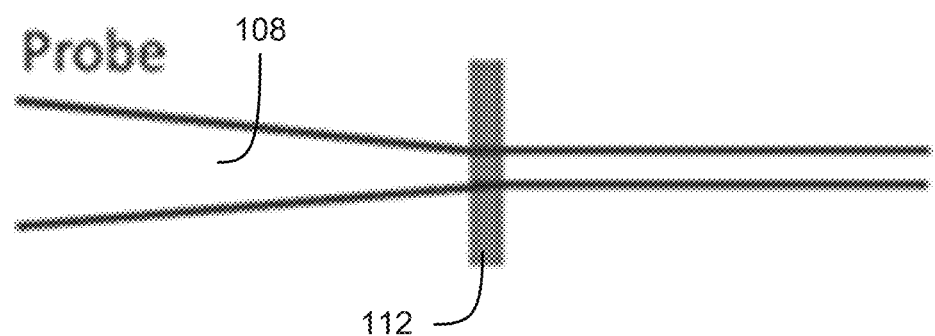
FIG. 2E shows another shows another example embodiment of a probe beam being directed to a medium.

In some embodiments, one or more of the first pump beam 104, the second pump beam 106, and the probe beam 108 are not collinear with one or more of the other beams. For example, the first and second pump beams 104, 106 can propagate through the medium along collinear paths, whereas the probe beam 108 propagates through the medium along a different path that is angled or offset relative to the collinear paths of the probe beams 104, 106. Alternatively, the first and second pump beams 104, 106 can be angled relative to each other, and can be configured to cross at the medium 112, as shown for example in FIG. 2D. The probe beam 108 can be angled relative to the first pump beam 104 and also relative to the second pump beam 106, and the probe beam 108 can be configured to propagate through the medium 112 at the location where the two pump beams 104, 106 cross, which is shown for example in FIG. 2E. Thus, the three beams 104, 106, 108 can come from different locations and can converge at the medium 112. This approach is shown schematically in FIG. 1. In some embodiments, the beam directing optical elements 110 can be omitted, such as if three separate lasers 102 are used to direct the respective beams 104, 106, 108 to the medium 112.

FIG. 2 shows an example embodiment of a system 100 for producing an optical element, such as a plasma lens. The system 100 can have a vacuum chamber 120, which can be configured to maintain a partial vacuum inside the vacuum chamber 120. A gas such as a gas jet or gas stream can be used as the non-linear medium 112. The system can have a gas supply 122 that can be configured to provide the gas jet or stream. The system can have a vacuum pump 124, which can extract the gas from the vacuum chamber 120. The inlet (e.g., gas supply 122) and the outlet (e.g., vacuum pump 124) for the gas medium 112 can be disposed on opposing sides of the vacuum chamber 120, or can face each other, to produce a finite gas jet through the vacuum chamber 120. The gas jet can be a stream of gas flowing from the inlet (e.g., gas supply 122) to the outlet (e.g., vacuum pump 124). The gas jet or stream can have a thickness, which can be defined for example by the sizes and positions of the inlet (e.g., gas supply 122) and the outlet (e.g., vacuum pump 124) or other features of the system 100. In some embodiments, a target of the output laser beam 114 can be inside the vacuum chamber 120, although in other implementations, the output laser beam 114 can be output from the system 100. In some embodiments, hydrogen or helium, or any other suitable gas can be used for the medium 112. Other materials, such as liquids or solids could be used for the medium 112. For example, a thin layer of a solid material (e.g., a foil) can be used as the medium 112. The solid material can have a thickness of about 0.0005 mm, about 0.00075 mm, about 0.001 mm, about 0.0025 mm, about 0.005 mm, about 0.0075 mm, about 0.01 mm, about 0.025 mm, about 0.05 mm, about 0.075 mm, about 0.1 mm, about 0.25 mm, or more, or any values or ranges between any combination of these values, although other thicknesses could be used in some cases. The solid medium 112 can be in a vacuum (e.g., inside the vacuum chamber 120). The pump laser beams 104, 106 can ionize part of the solid medium, which can produce an expanding gas-density plasma in some cases. The distribution of plasma can depend on the intensity of the light, so that the interference pattern between the pump beams 104, 106 can determine the distribution of the plasma. The system can include a support (e.g., a holder) configured to position the medium 112 (e.g., a plate or sheet or any suitable solid medium) relative to the one or more lasers 102 or laser beams so that the interference pattern can be formed at, on, and/or in the medium 112. The nonlinear medium 112 can be held in place by the support and the medium 112 may comprise a material (e.g., sheet, plate, foil, substrate, slab, etc.) which may be rigid or flexible and may be solid. The one or more lasers 102 and/or the optical element(s) 110 can be disposed or otherwise configured with respect to the support to direct the laser beams onto the nonlinear medium 112 so as to form an interference pattern at that location. The optics that can be used to direct the laser beams to the nonlinear medium 112 (or the location relative to the support or supply where the nonlinear medium would be provided) can include one or more mirrors, lenses, prisms, beam splitters, beam combiners, or any other suitable optical components. The system 100 can include a supply configured to provide the nonlinear medium 112. The supply can include a gas supply line, or a liquid supply line, a nozzle, or a flow cell (e.g., for transporting a liquid nonlinear medium 112), or transparent conduits, or chambers for example with transparent windows, or any other suitable device. The supply or support can position the medium 112 at the location where the interference pattern is formed. In some embodiments, a flow or stream of a liquid or gas can be formed between an inlet and an outlet, and the liquid or gas can be used as the nonlinear medium 112.

In some embodiments, the vacuum chamber 120 can be omitted. For example, the system 100 can operate in ambient air in some configurations. In some embodiments, the medium 112 can be a gas or other material with an ionization threshold that is lower than the ambient gas (e.g., air), so that the pump beams 104, 106 can ionize the medium 112 without ionizing other areas (e.g., air) in the system 100.

Figure 2F:
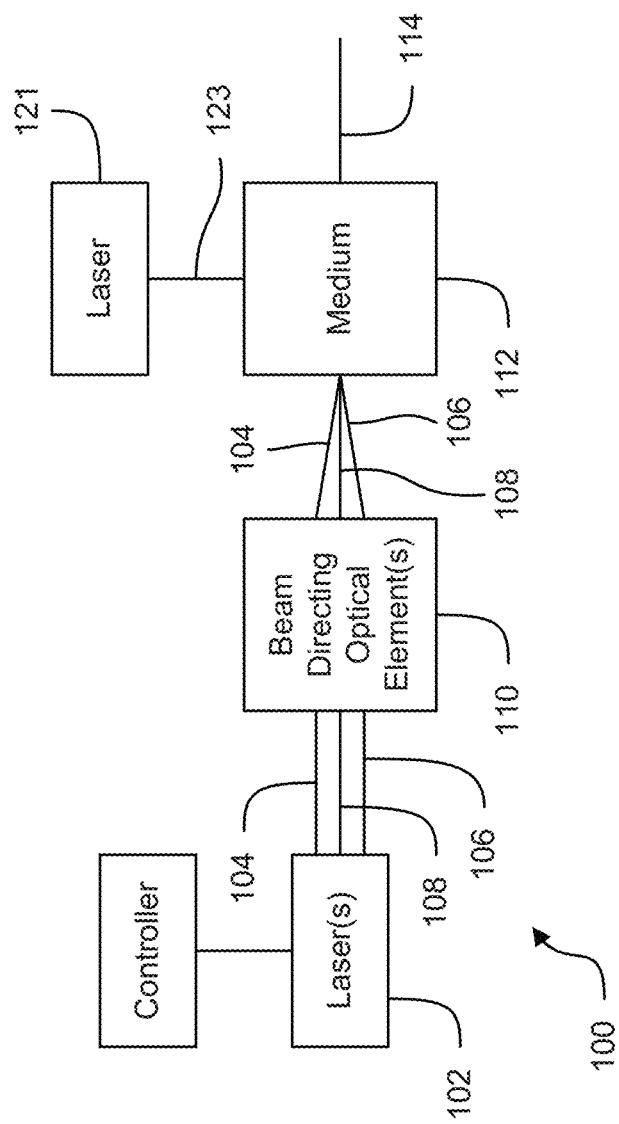
FIG. 2F shows another example embodiment of a system for making an optical element.

With reference to FIG. 2F, in some embodiments, the system can include a laser 121 that can direct a heater laser beam 123 through an area to produce a region of heated material (e.g., air) to supply the medium 112. In some embodiments, one or more optical elements (not shown) can modify the heater laser beam 123 to distribute the energy of the heater laser beam 123 across the area of the medium 112. The heater laser 123 can propagate perpendicular to one or more of the first pump beam 104, the second pump beam 106, and/or the probe beam 108. For example, one or more lenses (not shown) can spread or otherwise distribute the heater laser beam 123 to produce a heated area that can be similar in size to the stream of gas medium in other embodiments. In some configurations, the energy of the constructive interference between the first and second pump beams 104, 106 together with the energy from the heater laser beam 123 can be sufficient to ionize the material (e.g., air) in the area of the medium 112, whereas areas that do not receive the heater laser beam 123 do not ionize even when there is constructive interference. In some embodiments, heated ambient air can be the medium 112. In some embodiments, the system 100 can include three pump laser beams. Two of the pump laser beams can interfere to produce an interference pattern, as discussed herein, and the third pump laser beam can apply supplemental energy so that the areas of constructive interference can ionize the gas (e.g., ambient air). In some cases, the two pump laser beams 104, 106 can create pre-ionized regions (e.g., at locations of constructive interference), and the third pump laser beam (e.g., the heater beam 123) can ionize the pre-ionized regions. In some configurations, the size of the formed optical element (e.g., the plasma lens 130) can be limited to the area of interaction between the three pump lasers 104, 106, 123.

Figure 3:
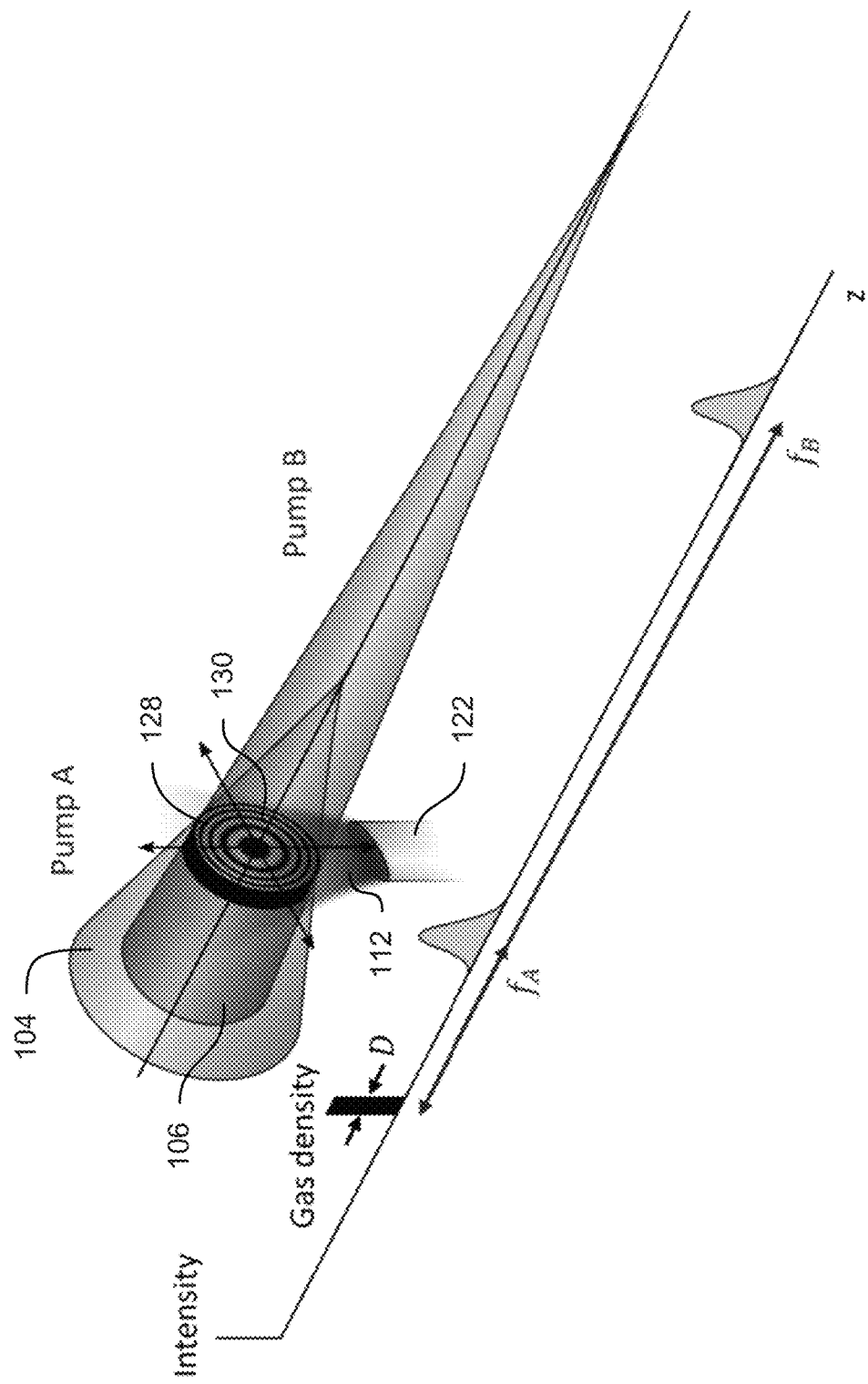
FIG. 3 shows an example embodiment of two pump beams overlapping in a gas jet to record an interference pattern to form an optical element.

FIG. 3 shows an example of two pump beams 104, 106 producing a holographic plasma lens 130 in a medium 112. A gas supply 122 can provide a gas medium (e.g., gas jet) 112, which can have a thickness D. In some implementations, the nozzle of the gas supply 122 can have an elongate shape that is shorter in the direction of propagation of the laser beams 104, 106 (e.g., direction Z in FIG. 3), and longer in the orthogonal direction. In some implementations multiple nozzles may be employed. In various implementations, the first pump laser beam 104 (e.g., Pump A) and the second pump laser beam 106 (e.g., Pump B) can be collinear. The pump laser beams 104, 106 can be substantially equal-power laser beams in some cases although their power and relative power may vary. The pump laser beams 104, 106 can be focused at different points along the path of propagation (e.g., the Z axis). The first pump beam 104 (e.g., Pump A), for example, can have a shorter focal length (e.g., with focal point $f_A$), and the second pump beam 106 (e.g., Pump B) can have a longer focal length (e.g., with focal point $f_B$). The f-number and focal lengths for each of the pump beams 104, 106 can be selected so that they have the same beam diameter at a location inside the medium 112 (e.g., as z=0) in some cases, although such as limitation is not required. The pump beams 104, 106 can propagate in a substantial vacuum except for the region of the gas medium (e.g., gas jet) 112, which can have thickness D and can be centered at z=0 (e.g., where the pump beams 104, 106 have the same diameters or cross-sectional sizes).

Figure 5:
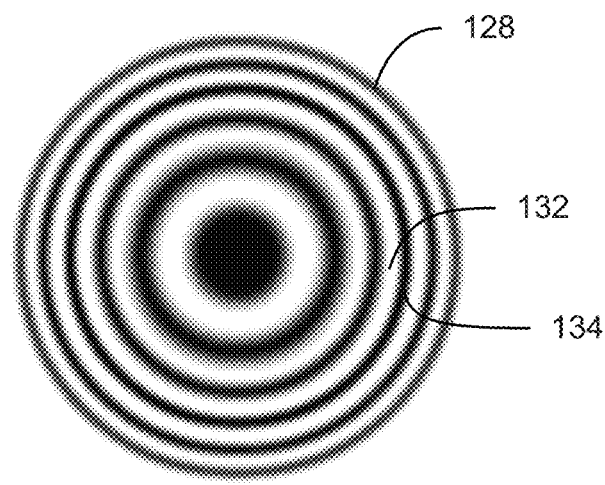
FIG. 5 shows an example embodiment of an interference pattern produced by two pump laser beams.

The two pump laser beams 104, 106 can produce an interference pattern 128 in the gas jet medium 112. The two pump beams 104, 106 can interfere everywhere that they overlap, but the interference pattern 128 is only recorded where the beams 104, 106 overlap in the gas jet medium 112. FIG. 5 shows an example embodiment of an optical interference pattern created in the medium 112 by the two pump beams 104, 106. The interference pattern can have regions of constructive interference 132 with high intensity light (e.g., possibly higher light intensity than either of the pump beams alone, and regions of destructive interference 134 with low intensity light (e.g., possibly lower light intensity than either of the pump beams). The medium 112 can be configured to have a variable index of refraction that depends on the intensity of light, so that the interference pattern 128 can modify the indices of refraction at different regions in the medium 112. With reference to FIG. 5, in some implementations the regions of constructive interference 132 can have a lower index of refraction than the regions of destructive interference 134, for example. The modulated index of refraction can be produced by a number of different mechanisms and in a number of different manners.

In some embodiments, special variant ionization (SVI) can produce the variations in the index of refraction in the medium 112. The medium 112 and the pump beams 104, 106 can be configured so that more of the medium 112 is converted into plasma at the regions of constructive interference 132, and less (or none) of the medium is converted into plasma at the regions of destructive interference 134. For example, in some implementations, only regions of constructive interference between the two pump beams 104, 106 have at sufficient intensity to ionize the gas medium 112. Although the medium 112 is discussed as being a neutral (e.g., non-ionized) gas, any suitable medium material could be used. By way of example, in some implementations, the index of refraction of the neutral gas medium can be greater than one (n>1), and the index of refraction of the plasma (e.g., ionized gas medium) can be less than one (n<1). Thus, as more of the gas medium in a region is ionized and converted into plasma, the index of refraction of that region can be reduced. Likewise, the distribution of the plasma (e.g., ionized gas) in the gas medium 112 (non-ionized gas) may be driven by light intensity. In some embodiments, the interference pattern can create concentric rings of plasma with non-ionized regions separating the concentric plasma rings such as for example in a Fresnel zone plate. For SVI, the magnitude of the induced change in the index of refraction $\Delta n$ can be about $10^{-2}$. For example, the difference between the index of refraction of the regions of constructive interference 132 and the regions of destructive interference 134 can be about 0.3, about 0.2, about 0.175, about 0.15, about 0.125, about 0.1, about 0.075, about 0.05, about 0.04, about 0.03, about 0.02, about 0.015, about 0.01, about 0.0075, about 0.005, about 0.004, about 0.003, about 0.002, about 0.001, about 0.00075, about 0.0005, about 0.00025, about 0.0001, or less, or any values or ranges between any of these values, although other amounts of index change can be implemented. The changes to the index of refraction can last for tens to hundreds of picoseconds, even when produce by femtosecond pump laser pulses. The modulated index of refraction can persist for about 1 picosecond, about 2 picoseconds, about 5 picoseconds, about 10 picoseconds, about 15 picoseconds, about 20 picoseconds, about 30 picoseconds, about 40 picoseconds, about 50 picoseconds, about 75 picoseconds, about 100 picoseconds, about 125 picoseconds, about 150 picoseconds, about 175 picoseconds, about 200 picoseconds, about 250 picoseconds, about 300 picoseconds, about 350 picoseconds, about 400 picoseconds, about 450 picoseconds, about 500 picoseconds, about 600 picoseconds, about 700 picoseconds, about 800 picoseconds, about 900 picoseconds, or more, or any values or ranges between these values, although other duration times can be produced.

In some embodiments, the variations in the index of refraction can be produced by ponderomotively-forced plasma density fluctuations. The ponderomotive force can impose a nonlinear force on a charged particle in an inhomogeneous oscillating electromagnetic field, and the ponderomotive force can cause the particle to move towards the area of the weaker field strength. Thus, the ponderomotive force can produce plasma density variations, and accompanying variations in the index of refraction, even if the medium is full-ionized gas (e.g., if all of the regions of constructive interference and destructive interference are plasma). In some embodiments, the regions of destructive interference 134 can have higher plasma density than the regions of constructive interference 132 due to the ponderomotive force, which can in some cases produce a lower index of refraction for the regions of destructive interference 134, as compared to the regions of constructive interference 132 (e.g., since vacuum has an index of refraction of 1). For the ponderomotive force, the magnitude of the induced change in the index of refraction $\Delta n$ can be about $10^{-4}$. For example, the difference between the index of refraction of the regions of constructive interference 132 and the regions of destructive interference 134 can be about 0.4, about 0.3, about 0.2, about 0.1, about 0.075, about 0.05, about 0.025, about 0.01, about 0.0075, about 0.005, about 0.0025, about 0.001, about 0.00075, about 0.0005, about 0.0004, about 0.0003, about 0.0002, about 0.00015, about 0.0001, about 0.000075, about 0.00005, or less, or any values or ranges between any of these values, although other amounts of index change can be implemented. The changes to the index of refraction can last for tens of picoseconds. The modulated index of refraction can persist for about 1 picosecond, about 2 picoseconds, about 5 picoseconds, about 10 picoseconds, about 15 picoseconds, about 20 picoseconds, about 30 picoseconds, about 40 picoseconds, about 50 picoseconds, about 75 picoseconds, about 100 picoseconds, or more, or any values or ranges between these values, although other duration times can be produced. In some embodiments, the medium 112 can be a plasma even before the pump laser beams 104, 106 apply energy to the medium 112. In some embodiments, the medium and the pump laser beams 104, 106 can be configured so that the pump laser beams 104, 106 substantially fully ionize the medium.

In some embodiments, variations in the index of refraction can be produced in the medium 112 without plasma. For example, an entropy wave approach can produce changes in the index of refraction within the medium that come from density fluctuations in the gas based on the intensity of the light. In some cases, thermally-driven density fluctuations can produce a lower index of refraction at the regions of constructive interference 132 or relative high light intensity. For the approach using density fluctuations in gas, the magnitude of the induced change in the index of refraction $\Delta n$ can be about $10^{-5}$. For example, the difference between the index of refraction of the regions of constructive interference 132 and the regions of destructive interference 134 can be about 0.00005, about 0.00004, about 0.00003, about 0.00002, about 0.000015, about 0.00001, about 0.0000075, about 0.000005, or less, or any values or ranges between any of these values, although other amounts of index change can be implemented. The changes to the index of refraction can last for hundreds of nanoseconds. For example, the modulated index of refraction can persist for about 25 nanoseconds, about 50 nanoseconds, about 75 nanoseconds, about 100 nanoseconds, about 150 nanoseconds, about 200 nanoseconds, about 250 nanoseconds, about 300 nanoseconds, about 400 nanoseconds, about 500 nanoseconds, about 600 nanoseconds, about 700 nanoseconds, about 800 nanoseconds, about 900 nanoseconds, or more, or any values or ranges between these values, although other duration times can be produced. Accordingly, in some embodiments, the optical element (e.g., diffractive lens) can be produced without plasma.

Figure 6:
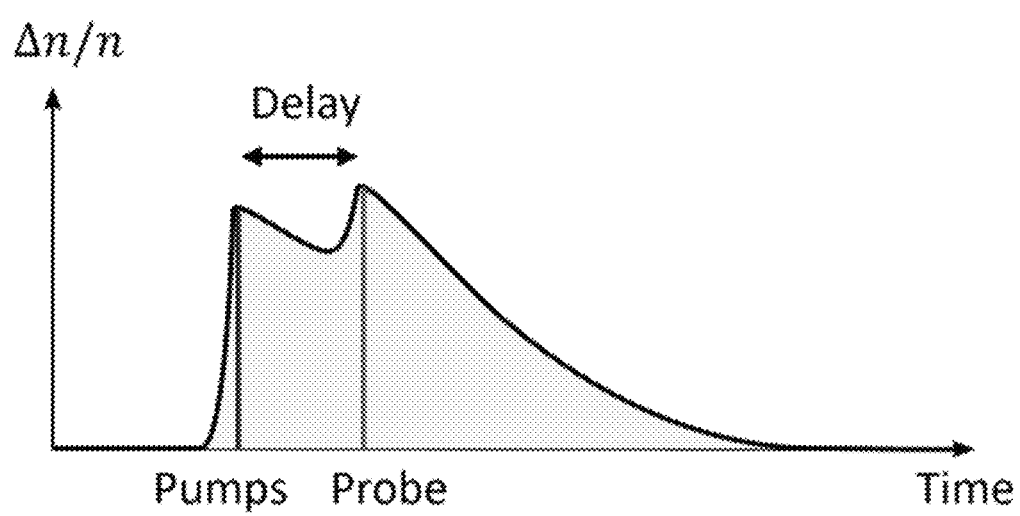
FIG. 6 shows a graph showing how the index of refraction is changed over time.

FIG. 6 shows a chart that illustrates the change in the index of refraction over time as the pump beams 104, 106 and the pulse beam 108 are applied to the medium 112 in an example embodiment. The pump beams 104, 106 can be directed to the medium 112 at a first time, which can produce a peak in the modulation of the refractive index in the medium 112. After the pulse of the pump beams 104, 106, the change in the index of refraction can decay over time for a delay period of time. Then the probe beam 108 can be applied at a second time. In some embodiments, the energy of the probe beam can modify the index of refraction of the medium 112. After the probe beam 108, the change in the index of refraction can decay over time. Accordingly, in various implementations, the optical element (e.g., diffractive lens 130) formed in the medium 112 can be transitory. The decay time can depend on the type of medium used and the manner in which the index of refraction was modified (e.g., SVI, ponderomotive forcing, or entropy wave).

The optical element (e.g., holographic plasma lens) can persist after the end of the pump laser beams 104, 106 for a time that is longer than the pulses of the pump laser beams 104, 106, such as about 2 times longer, about 5 times longer, 10 times longer, about 25 times longer, about 50 times longer, about 75 times longer, about 100 times longer, about 150 times longer, about 250 times longer, about 500 times longer, about 750 times longer, about 1,000 times longer, times longer, about 1,250 times longer, about 1,500 times longer, about 1,750 times longer, about 2,000 times longer, about 2,500 times longer, about 3,000 times longer, about 4,000 times longer, about 5,000 times longer, about 7,500 times longer, about 10,000 times longer, about 15,000 times longer, about 25,000 times longer, about 50,000 times longer, about 100,000 times longer, about 150,000 times longer, about 200,000 times longer, or more, or any values or ranges between any combination of these values, although other configurations are possible.

Moreover, in various implementations the optical element (e.g., holographic plasma lens) can persist long enough after the end of the pump laser beams 104, 106 (e.g., after the pump laser beam pulse), that a laser pulse of the probe beam 108 can be delivered to the medium after the end of the pulses of the first and second pump laser beams 104, 106 by a delay time, which delay can be about 1 picosecond, about 5 picoseconds, about 10 picoseconds, about 25 picoseconds, about 50 picoseconds, about 75 picoseconds, about 100 picoseconds, about 150 picoseconds, about 200 picoseconds, about 250 picoseconds, about 300 picoseconds, about 350 picoseconds, about 400 picoseconds, about 450 picoseconds, about 500 picoseconds, about 600 picoseconds, about 700 picoseconds, about 800 picoseconds, about 900 picoseconds, about 1,000 picoseconds, or more, or any values or ranges between any combination of these values, although other configurations are possible. The probe beam 108 can be a femtosecond laser pulse or a picosecond laser pulse, although any suitable pulse duration can be used. In some implementations, the pulse of the probe beam 108 can be longer than the pulses of the pump beams 104, 106, such as about 2 times longer, about 5 times longer, 10 times longer, about 25 times longer, about 50 times longer, about 75 times longer, about 100 times longer, about 150 times longer, about 250 times longer, about 500 times longer, about 750 times longer, about 1,000 times longer, or more, or any values or ranges between any combination of these values, although other configurations are possible. In some embodiments, the probe beam 108 can have a shorter duration than one or both of the pump beams 104, 106. For example, the pump beams 104, 106 can be 100 ns long in some cases, and the probe beam could be a 10 fs pulse.

Various different interference patterns can be created by overlapping the first and second pump laser beams 104, 106. The interference between two collinear pump beams 104, 106 with different focal lengths can produce variations in the index of refraction in the medium 112 that operate as a zone plate. As discussed above, the term zone plate such as Fresnel zone plate applies in various cases described herein even where the medium is not rigid. For example, the zone plates formed in plasma and/or gas may not be rigid like glass but are nevertheless referred to herein as a zone plate. A zone plate can be formed by concentric alternating regions of phase shifting material that are spaced so that the transmitted light interferes constructively at the focal point. The thickness and/or spacing of the regions (e.g., of higher and lower indices of refraction) can decrease moving radially outward from the center of the zone plate. The zone plate can operate as a diffractive lens. In some embodiments, the zone plate can focus light at multiple points (e.g., by diffracting the light to produce constructive interference at the multiple points). For example, a plane wave incident on a zone plate can be focused at points $f_m = f/m$ for integers m, including virtual foci for negative integers m. Other patterns, however, are possible. For example, the pattern may or may not comprise rings, which may or may not be concentric. The rings or fringes may or may not have reduced thickness and/or spacing with distance from the center. The pattern however need not be rotationally symmetric. In some cases, the pattern does not comprise rings. In some configurations, elliptical interference patterns can be produced, such as from astigmatic focusing.

Figure 4:
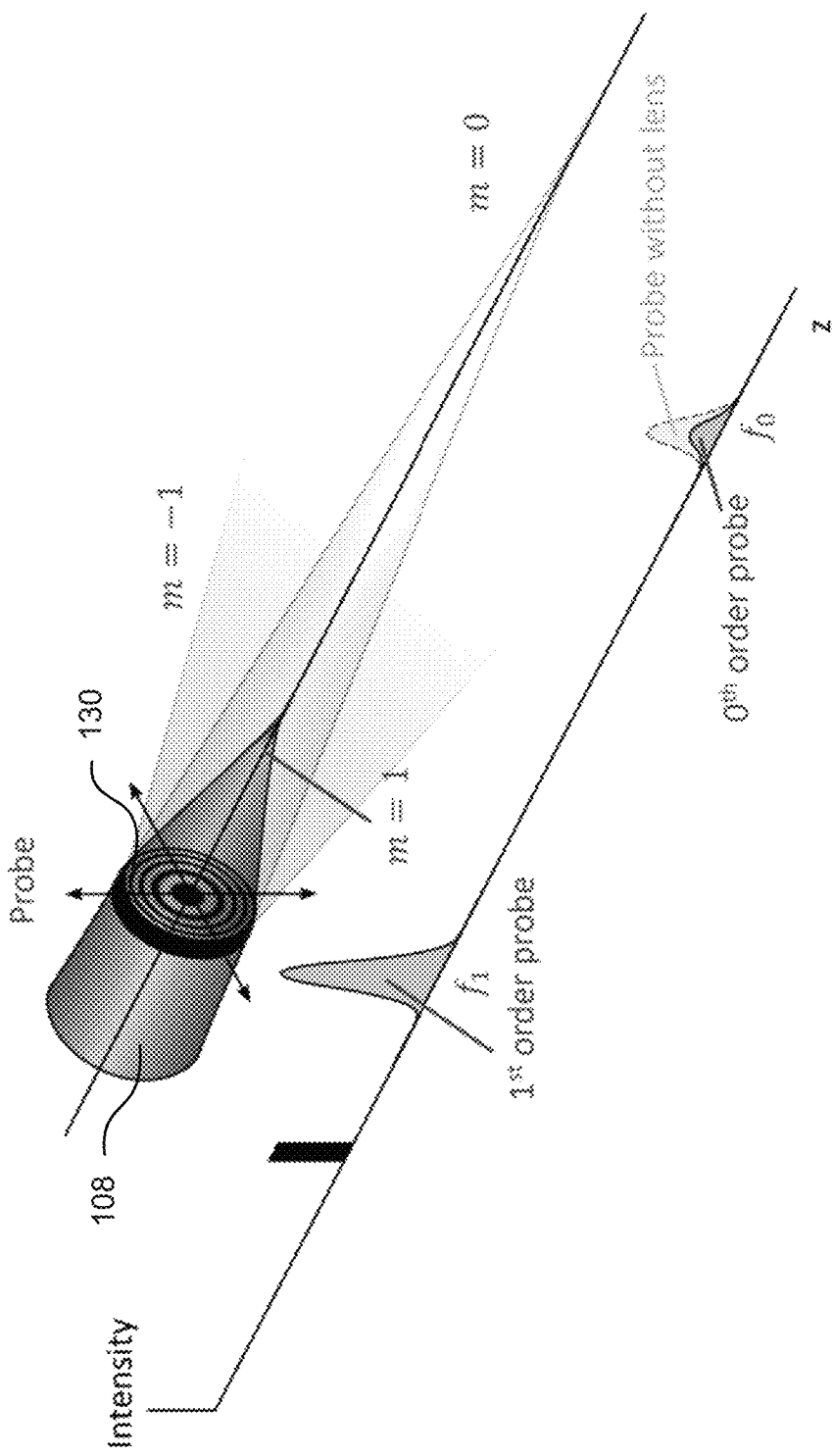
FIG. 4 shows a probe beam propagating through the optical element of FIG. 3.

FIG. 4 shows a probe beam 108 propagating through the lens 130 (e.g., a diffractive lens or a holographic plasma lens) that was formed in the medium 112, so that the probe beam 108 is focused by the lens 130. In some implementations, the probe beam 108 can propagate through the medium 112 in the same direction and along the same collinear path as the pump laser beams 104, 106. The probe beam 108 can possibly be converging and can have a focal point at $f_0$ before being modified by the lens 130. In some implementations, the lens 130, however, can focus the probe beam 108 at the focal point $f_1$ (e.g., as the first order probe beam focal point for m=1), which can be closer to the lens 130 than the original focal point $f_0$. In some embodiments, the lens 130 can focus some of the light at the focal point $f_0$ (e.g., as the 0 order probe beam focal point for m=0). The lens 130 can also defocus some of the light to that it has a virtual focal point $f_{-1}$ (e.g., the first negative order probe beam focal point for m=−1). Some of the light can also be focused at higher order focal points that are not shown in FIG. 4. Without subscribing to any particular scientific theory, in some implementations, the diffractive lens 130 can focus or defocus the light by diffracting the light to produce constructive interference at the focal points, for example.

In some implementations, the distribution of the energy of the probe beam 108 across the different orders can depend on the thickness of the medium 112 (e.g., the thickness of the diffractive lens 130). A thinner medium (e.g., a thinner lens 130) can be handle a wider range of probe beam wavelengths and angles and variations thereof, as compared to a thicker medium. However, a thinner medium (e.g., a thinner lens 130) may also distribute more energy into multiple focal orders, as compared to a thicker medium. A thicker medium (e.g., a thicker lens 130) can have better a higher efficiency than a thinner medium, as more of the energy can be delivered to a single focal order. Such efficiency, for example, may be measured as the amount of light that is focused to a single order in comparison to the light incident on the lens (e.g., quantified by percentage). The thin lens 130 embodiments can operate in the Raman-Nath regime, where the light is diffracted into multiple orders, which can produce multiple focal spots in some cases. The thick lens 130 embodiments can operate in the Bragg regime where light is diffracted to produce a single focus. The differentiation between "thin" and "thick" diffractive lenses 130 can depend on the wavelength of the probe beam 108. The diffractive lens 130 can have a thickness of about 0.001 mm, about 0.005 mm, about 0.01 mm, about 0.05 mm, about 0.1 mm, about 0.5 mm, about 1 mm, about 50 mm, about 100 mm, or more, or any values or ranges between these values, although other sizes could be used.

Figure 7:
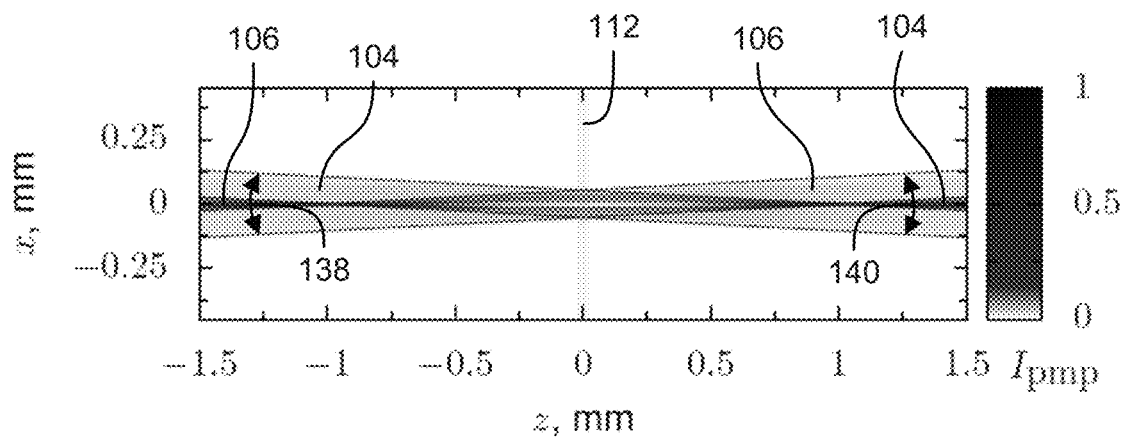
FIG. 7 shows an example embodiments of two probe beam overlapping to create an interference pattern at a medium.
Figure 8:
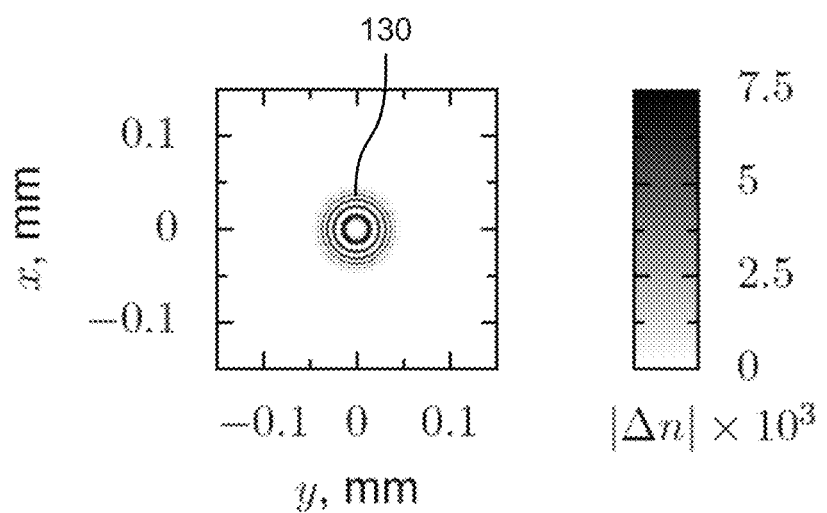
FIG. 8 shows the changes to the index of refraction of a medium produced by the two probe beams and the interference thereof.

FIGS. 7 to 10 show an example embodiment of a lens 130 formed using a thin medium having a thickness of 40 microns. The thickness of the medium 112 can determine the thickness of the diffractive lens 130 (e.g., plasma lens). As shown in FIG. 7, a first pump beam 104 with a focal length of 1 mm and a second pump beam 106 with a focal length of −1 mm can be directed along a collinear path through the medium 112. The first pump beam 104 can have a wavelength of about 400 nm and a beam convergence angle 138 of about 6 degrees. The second pump beam 106 can have a wavelength of about 400 nm and a beam divergence angle 140 of about 6 degrees. The pump beams 104, 106 can overlap in the medium 112. The overlapping pump beams 104, 106 can have substantially the same diameters in the medium 112. The pump beams 104, 106 can interfere with each other in and around the medium 112, as shown by the horizontal stripes in FIG. 7 where the pump beams 104, 106 intersect the medium 112. The interference pattern produced by the pump beams 104, 106 can modify the index of refraction in the medium 112. For example, FIG. 8 shows the index modulation created by plasma using spatially variant ionization (SVI). In this example, the peak index modulation can reach about 0.0075. The modulated index pattern can form a zone plate, which can have a focal length of about 0.5 mm.

Figure 9:
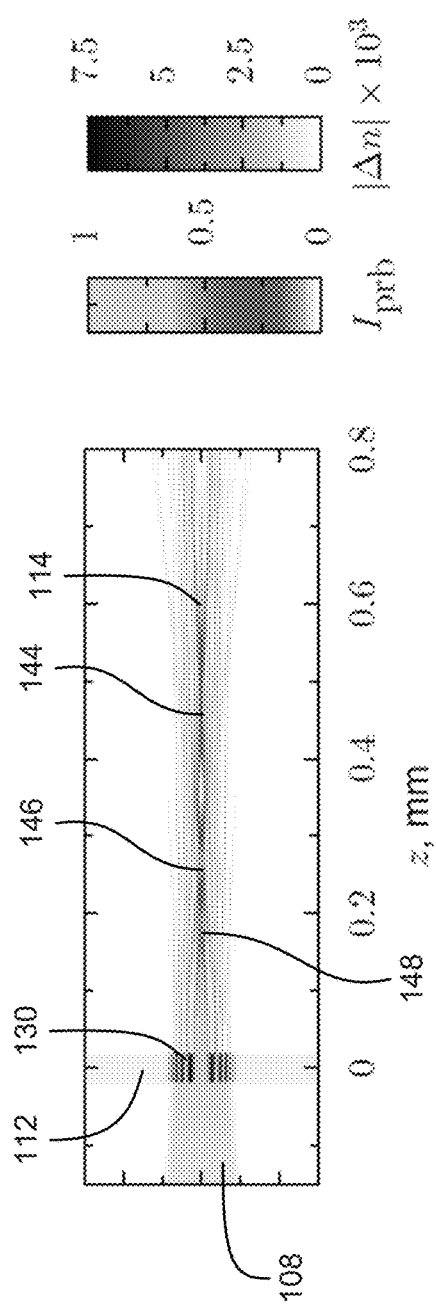
FIGS. 9 and 10 show an example embodiment of a probe beam propagating through an optical element created by the pump beams in a relatively thin medium.
Figure 10:
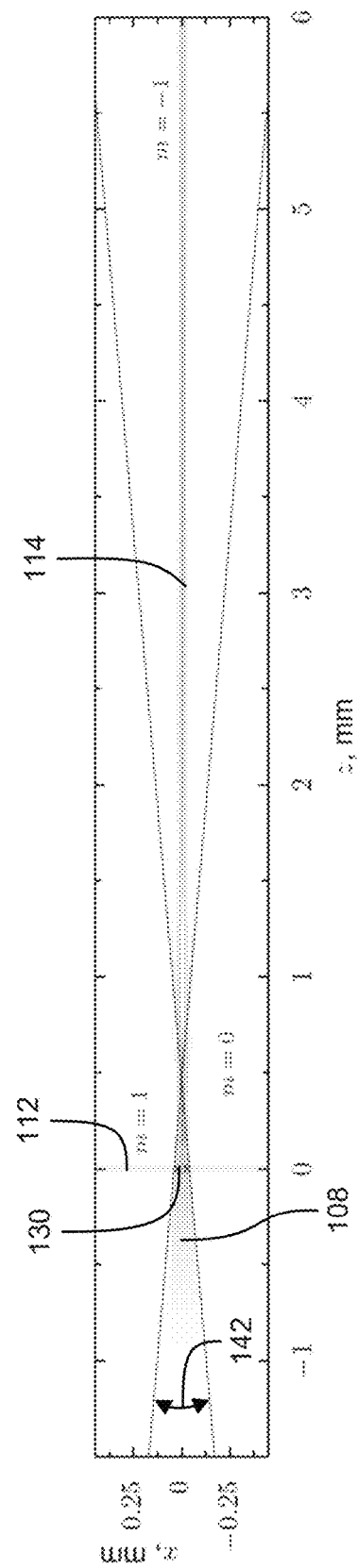

FIGS. 9 and 10 show the probe beam 108 propagating through the lens 130 that was formed in the medium 112. FIG. 9 shows the propagation of the probe beam 108 to about 0.8 mm after the center of the lens 130, whereas FIG. 10 shows the propagation of the probe beam 108 to about 6 mm after the center of the lens 130. FIGS. 9 and 10 show that the probe beam 108 can be diffracted by the diffractive lens 130. Constructive interference in the diffracted light of the probe beam 108 can effectively focus the light of the probe beam 108. The probe beam 108 can have a wavelength of 400 nm, a beam convergence angle 142 of 10 degrees, and a focal point of 0.455 mm, and the parameters of the probe beam 108 and the lens 130 can be configured so that the first negative focal order (m=−1) is a substantially collimated beam, as can be seen in FIG. 10. FIG. 9 shows that the lens 130 also effectively focuses light at the residual, zero order focal spot 144 of the probe beam 108 at about z=0.455 mm. FIG. 9 also shows that the lens 130 can focus light at a first order focal spot 146 (m=1) at about 0.24 mm, and a second order focal spot 148 (m=2) at about 0.16 mm. In the embodiment of FIGS. 9 and 10 much of the energy is divided between multiple focal orders. In the embodiment of FIG. 10, about 40% of the energy of the probe beam 108 is calculated as going into the collimated beam.

Figure 11:
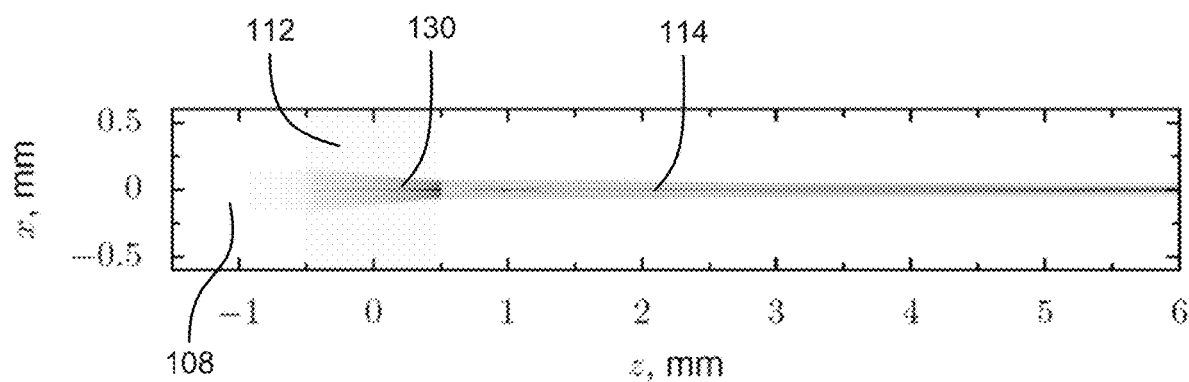
FIG. 11 shows an example embodiment of a probe beam propagating through an optical element created by the pump beams in a relatively thick medium.

FIG. 11 shows an example embodiment of a lens 130 made using a relatively thick medium having a thickness of 1 mm. The lens 130 can be created by a first pump beam 104 with a wavelength of about 400 nm, with a focal point at about 1 mm, and with a beam convergence angle of about 12 degrees, and a second pump beam 106 with a wavelength of about 400 nm, with a focal point at about 6 mm, and with a beam convergence angle of about 2 degrees. The first and second pump beams 104, 106 can have equal power. In FIG. 11, the probe beam 108 can substantially match some parameters of the first pump beam 104, having a wavelength of about 400 nm, a focal point at about 1 mm, and a beam convergence angle of about 12 degrees. The pulse beam 108 can have more power than the first pump beam 104. The lens 130 can modify the pulse beam 108 so that the modified pulse beam 114 has some parameters that substantially match the second pump beam 106, such as a focal point at about 6 mm and a beam convergence angle of about 2 degrees. In the embodiment of FIG. 11, about 85% or more of the probe beam energy can be transferred to the first negative order (m=−1) focal point.

In some embodiments, the efficiency can be improved by using a probe beam 108 that substantially matches some parameters of one of the pump beams 104, 106. For example, the probe beam 108 can have a wavelength, a focal length, a beam convergence or divergence angle, propagation angle, or an f-number, or any combination of these parameters, that vary from the corresponding pump beam 104 or 106 by no more than about 20%, no more than about 15%, no more than about 10%, no more than about 7%, no more than about 5%, no more than about 4%, no more than about 3%, no more than about 2.5%, no more than about 2%, no more than about 1.5%, no more than about 1%, no more than about 0.5%, no more than about 0.25%, no more than about 0.1%, or less, or any values or ranges therebetween but may be outside these ranges in some implementations. In various implementations, the probe beam 108 can be substantially collinear with the corresponding pump beam 104 or 106.

Figure 12:
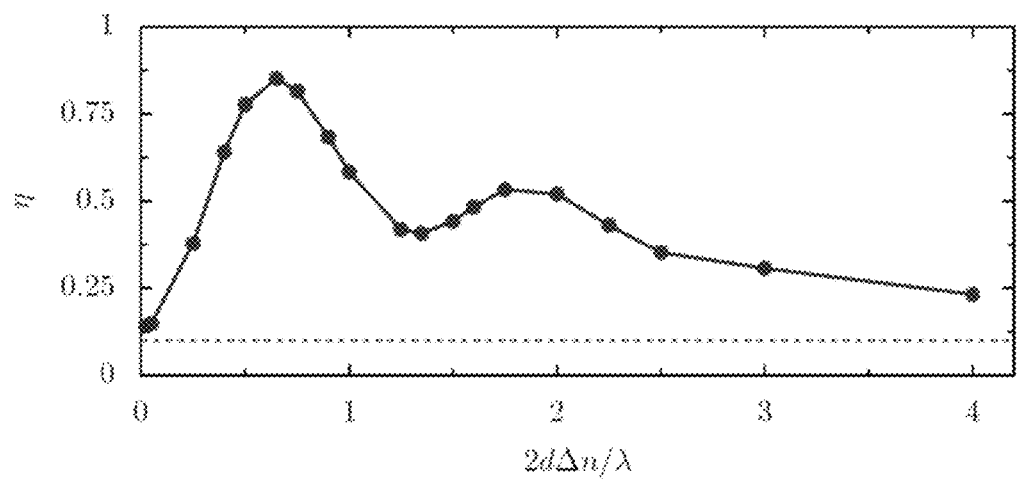
FIG. 12 shows a chart of efficiency for example embodiments for modifying a probe beam using the optical element of FIG. 11.

The efficiency of the lens 130 can depend on the thickness of the medium 112 (and the thickness of the lens or diffractive or holographic optical element 130), as discussed here. The efficiency of the lens 130 can depend on the amount of change in the index of refraction Δn. FIG. 12 shows a graph with efficiency on the y-axis and $2d\Delta n/\lambda$ on the x-axis, where d is the thickness of the lens 130, where Δn is the change in the index of refraction in the medium 112 from the pump beams 104, 106, and wherein λ is the wavelength of the light. For the data in the graph of FIG. 12, Δn was modified with a constant d. In the example of FIG. 11, the peak efficiency of about 85% was for a Δn value of about 0.00013, for the medium thickness d of about 1 mm, and a wavelength of 400 nm, which yielded a $2d\Delta n/\lambda$ value of about 0.65. The results in FIGS. 7-15 were calculated from simulations.

In some embodiments, the system 100 can be configured to enable adjustment of one or more parameters of the gas jet to vary the amount of change of the index of refraction Δn. Δn can be adjusted by changing (1) gas jet density, (2) gas jet composition, (3) pump laser intensity, (4) probe laser wavelength (5) time delay between pump laser and probe laser and the system 100 can be configured to adjust any one or more of these parameters. Other approaches could be used to change Δn. In some embodiments, the thickness d of the medium 112, and the lens 130, can be adjustable. The gas supply 122 can have an adjustable or interchangeable nozzle to change the size, or shape, or width of the gas jet. The system can include an actuator (e.g., under control of the controller 116) or a manual mechanism that is configured to narrow or widen the inlet for the gas jet. The medium thickness can be modified in various ways. For example, a nozzle that has an ellipsoidal shape (or other noncircular shape) can be rotated so a different side faces the beam. In some cases, adjusting the position of a sharp edge in the gas jet can create a shock that can change the shape or size of the gas jet medium. In some embodiments, a gas cell can be used. For example, the gas cell can mostly contain the gas in chamber with small holes so that the gas can gradually stream out of the small holes. The holes can be formed in the ends where the laser beam exits or enters, for example. The gas cell can be adjustable to control the amount of gas that is released and/or to control the distribution of the gas. In some embodiments, the nozzle or supply for the gas jet or stream can be movable, such as to adjust the height, so that the pump beams 104, 106 interact with different portions of the expanding column of gas, depending on the adjusted height.

In some embodiments, the medium 112 and/or the lens 130 can have a thickness of about 10 microns, about 20 microns, about 30 microns, about 40 microns, about 50 microns, about 75 microns, about 100 microns, about 150 microns, about 200 microns, about 250 microns, about 300 microns, about 400 microns, about 500 microns, about 600 microns, about 700 microns, about 800 microns, about 900 microns, about 1 mm, about 1.25 mm, about 1.5 mm, about 2 mm, about 2.5 mm, about 5 mm, about 7.5 mm, about 10 mm, about 20 mm, about 30 mm, about 40 mm, about 50 mm, about 60 mm, about 70 mm, about 80 mm, about 90 mm, about 100 mm, or more, or any values or ranges between any of these number, although other thicknesses could be used in some implementations.

Figure 13:
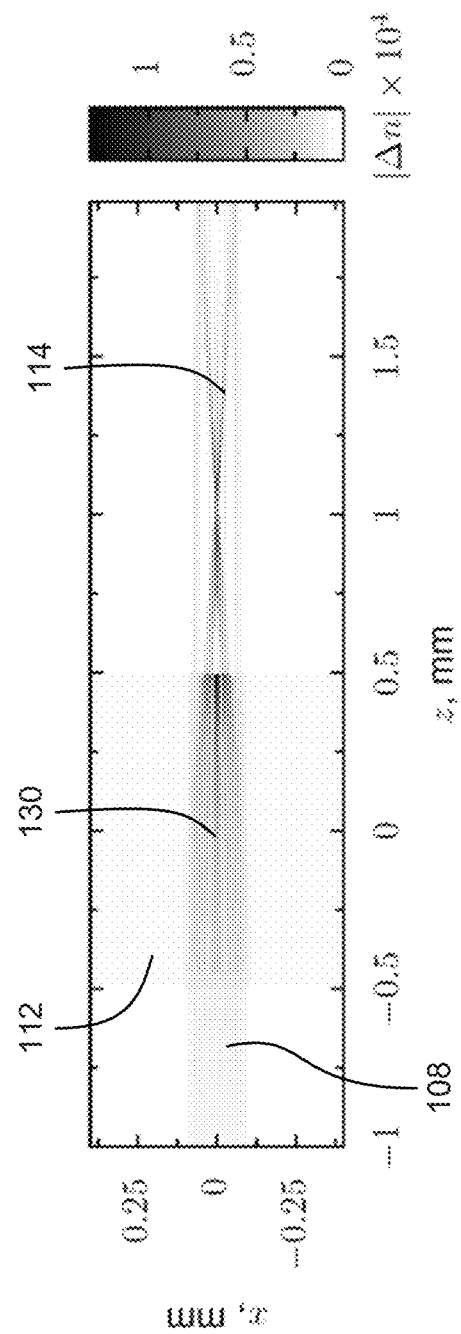
FIG. 13 shows another example embodiment of a probe beam propagating through an optical element created by the pump beams in a relatively thick medium.
Figure 15:
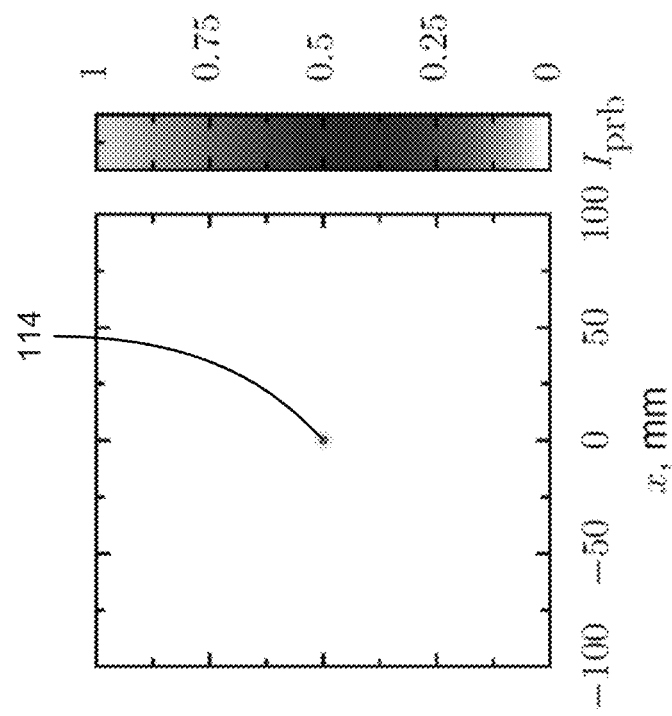
FIG. 15 shows the modified focal spot of the probe beam of FIG. 13.
Figure 14:
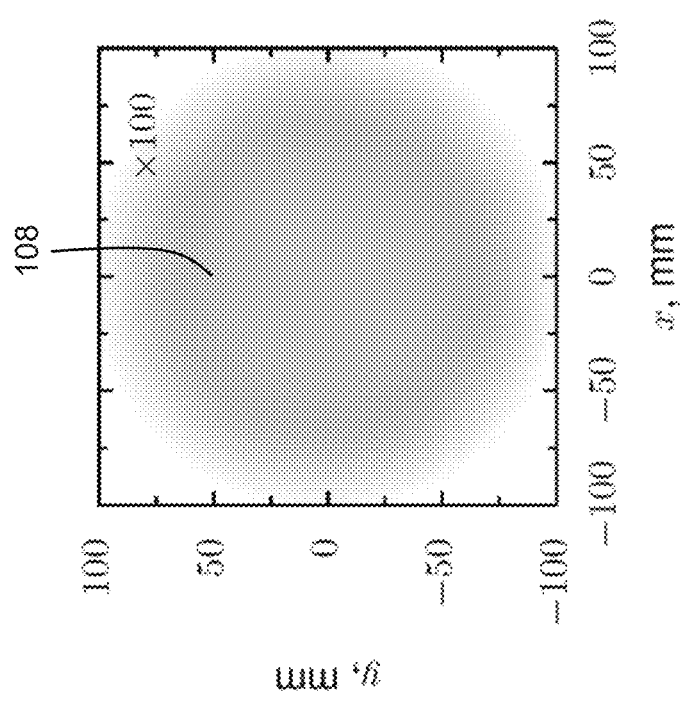
FIG. 14 shows the original focal spot of the probe beam of FIG. 13.

FIG. 13 shows an example embodiment of a lens 130 made using the same lens 130 of FIG. 11, except that in FIG. 13 the probe beam 108 can substantially match some parameters of the second pump beam 106, having a wavelength of about 400 nm, a focal point at about 6 mm, and a beam convergence angle of about 2 degrees. The pulse beam 108 can have more power than the second pump beam 106. The lens 130 can modify the pulse beam 108 so that the modified pulse beam 114 has some parameters that substantially match the first pump beam 104, such as a focal point at about 1 mm and a beam convergence angle of about 12 degrees. The lens 130 can change the focal spot from the original focal spot of the probe beam 108 shown in FIG. 14 to the focal spot of the modified probe beam 114 shown in FIG. 15, which can be more than 200 times higher intensity than the original spot of FIG. 14. In the embodiment of FIG. 13, about 80% of the probe beam energy can be transferred to the first order (m=1) focal point 148, which is at about z=1 mm in FIG. 13.

In various implementations, the diffractive optical elements disclosed herein can be beneficial for modifying light with higher intensities or energy fluxes in the probe beam 108 than are used in the pump beams 104, 106 that are used to create the diffractive optical element. High energy flux for the probe beam 108 can be achieved since the non-linearity is primarily driven by intensity. In some embodiments, the probe beam can stay below the ionization threshold intensity of the nonlinear material, so that the probe beam will have little effect on the lens. In some such cases, a probe pulse that is much longer than the pump pulses can be diffracted. In some cases, a probe pulse that is up to 100 ps longer than the pumps can be efficiently diffracted. By way of example, in some implementations, the intensity of the probe is a tenth that of the pumps, and can contain three orders of magnitude more energy than the pumps.

In various implementations the holographic is a transmissive lens. The probe beam is modified (focused, collimated) upon transmission through the lens. Such transmission lens may, for example, have higher index modulation than a reflection based holographic optical element type optical element where the probe beam is reflected off the holographic optical element and, for example, the reflected beam is focused or collimated. Such transmission lenses may have an efficiency greater than 50%, 60%, 70%, 80%, 90%, 95%, 99% and/or less or equal to 100% (e.g., less than 100%) or less than or equal to 99% or less than or equal to 98% or less than or equal to 95% or less than or equal to 90% or have an efficiency in any ranges formed by any of these values.

Many variations are possible. With reference to FIG. 5, in some embodiments, the interference pattern can have a region of constructive interference at the center although the interference pattern need not be so limited. Various types of zone plates can be implemented with the systems and methods disclosed herein. The zone plate can be a sinusoidal zone plate, or a Gabor zone plate, a binary zone plate, or a Rayleigh-Wood zone plate, etc. In some embodiments, one or both of the pump laser beams 104, 106 can be collimated, diverging, or converging, or any combination thereof. The pump laser beams 104, 106 can be angled relative to each other, in some cases, including, for example when the pump laser beams are collimated. Various other interference patterns can be created using the pump laser beams 104, 106, such as for creating holographic or diffraction patterns for optical functions other than the lens operations discussed herein. In some implementations, the pump laser beams 104, 106 do not overlap fully in the medium 112. For example, one pump laser beam 104 can be smaller or larger than the other, or they can overlap only partially. The interference pattern can be formed at the area where the pump laser beams 104, 106 do overlap.

In some embodiments, the first pump beam 104 and/or the second pump beam 106 used for SVI can have an intensity of at least about $10^{11}$ W/cm$^2$, at least about $10^{12}$ W/cm$^2$, at least about $10^{13}$ W/cm$^2$, at least about $10^{14}$ W/cm$^2$, at least about $10^{15}$ W/cm$^2$, at least about $10^{16}$ W/cm$^2$ or more, or any values or ranges between any combination of these values, although other intensities could be used. The first pump beam 104 and/or the second pump beam 106 used for ponderomotively-forced plasma density fluctuations can have an intensity of at least about $10^{12}$ W/cm$^2$, at least about $10^{13}$ W/cm$^2$, at least about $10^{14}$ W/cm$^2$, at least about $10^{15}$ W/cm$^2$, at least about $10^{16}$ W/cm$^2$, at least about $10^{17}$ W/cm$^2$, at least about $10^{18}$ W/cm$^2$, or more, or any values or ranges between any combination of these values, although other intensities could be used.

In some embodiments, the probe beam 108 used for SVI can have an intensity of at least about $10^{11}$ W/cm$^2$, at least about $10^{12}$ W/cm$^2$, at least about $10^{13}$ W/cm$^2$, at least about $10^{14}$ W/cm$^2$, at least about $10^{15}$ W/cm$^2$, at least about $10^{16}$ W/cm$^2$, at least about $10^{17}$ W/cm$^2$, or more, or any values or ranges between any combination of these values, although other intensities could be used. The probe beam 108 used for ponderomotively-forced plasma density fluctuations can have an intensity of at least about $10^{11}$ W/cm$^2$, at least about $10^{12}$ W/cm$^2$, at least about $10^{13}$ W/cm$^2$, at least about $10^{14}$ W/cm$^2$, at least about $10^{15}$ W/cm$^2$, at least about $10^{16}$ W/cm$^2$, at least about $10^{17}$ W/cm$^2$, at least about $10^{18}$ W/cm$^2$, at least about $10^{19}$ W/cm$^2$, at least about $10^{20}$ W/cm$^2$, or more, or any values or ranges between any combination of these values, although other intensities could be used.

Select Examples

Certain examples are provided below for illustrative purposes. The embodiments are not limited to the specific examples recited herein.

1. A system for making a diffractive optical element, the system comprising:
    at least one laser configured to provide first and second laser beams, and
    a nonlinear medium, or a supply configured to provide a nonlinear medium, or a support configured to hold a nonlinear medium, said first and second laser beams disposed with respect to each other and with respect to said nonlinear medium so that the first and second laser beams are configured to interfere and form an interference pattern on the nonlinear medium;
    wherein the interference pattern is configured to alter a characteristic of the nonlinear medium so as to produce a diffractive optical element that is configured to modify the propagation of a third laser beam transmitted therethrough.

2. The system of Example 1, wherein the system comprises the nonlinear medium.

3. The system of any one of Examples 1 to 2, wherein the diffractive optical element comprises a diffractive lens.

4. The system of any one of Examples 1 to 3, wherein the nonlinear medium comprises a gas.

5. The system of Example 4, where in the supply comprises a gas supply line.

6. The system of any one of Examples 1 to 3, wherein the nonlinear medium comprises a solid.

7. The system of any one of Examples 1 to 3, wherein the nonlinear medium comprises a liquid.

8. The system of Example 7, where in the supply comprises a liquid supply line.

9. The system of any one of Examples 1 to 3, wherein the nonlinear medium comprises a liquid.

10. The system of any one of Examples 1 to 9, wherein the at least one laser comprises a first laser that is configured to produce the first and second laser beams.

11. The system of Example 10, wherein the first laser is a pulsed laser and wherein the first and second laser beams comprise pulsed laser beams.

12. The system of any one of Examples 10 to 11, further comprising a second laser that is configured to produce the third laser beam.

13. The system of Example 12, wherein the second laser is a pulsed laser and wherein the third laser beam is a pulsed laser beam.

14. The system of any one of Examples 1 to 13, wherein the third laser beam has a higher energy density than the first and second laser beams.

15. The system of any one of Examples 1 to 14, wherein the first and second laser beams are collinear.

16. The system of Example 15, wherein the third laser beam is not collinear with the first and second laser beams.

17. The system of any one of Examples 1 to 14, wherein the first laser beam, the second laser beam, and the third laser beam are collinear.

18. The system of any one of Examples 1 to 14, wherein any two of the first, second or third laser beams are collinear.

19. The system of any one of Examples 1 to 14, wherein any two of the first, second, and third laser beams are disposed at an angle such that at least two of the first, second, or third laser beams are not collinear.

20. The system of any one of Examples 1 to 14, wherein the first, second and third laser beams are disposed at angles with respect to each other such that they are not collinear.

21. The system of any one of Examples 1 to 20, wherein the first and second laser beams have the same wavelength.

22. The system of any one of Examples 1 to 21, wherein the diffractive optical element comprises a diffractive lens.

23. The system of any one of Examples 1 to 22, wherein the diffractive optical element comprises a plasma lens.

24. The system of any one of Examples 1 to 23, wherein the diffractive optical element comprises a zone plate.

25. The system of any one of Examples 1 to 24, wherein the interference pattern is configured to alter the index of refraction of the nonlinear medium.

26. The system of any one of Examples 1 to 25, wherein the diffractive optical element comprises a diffractive lens that is configured to produce multiple diffractive orders.

27. The system of any one of Examples 1 to 25, wherein the diffractive optical element comprises a diffractive lens that is configured to provide a single diffractive order.

28. The system of any one of Examples 1 to 27, wherein the nonlinear medium comprises gas configured to be ionized by the first and second beams to form a plasma.

29. The system of Example 28, wherein the plasma has a different index of refraction than the gas.

30. The system of any one of Examples 1 to 29, wherein the diffractive optical element comprises a diffractive lens that is configured to provide a negative diffractive order.

31. The system of any one of Examples 1 to 30, wherein the nonlinear medium has a light intensity dependent index of refraction.

32. The system of any one of Examples 1 to 31, wherein the interference pattern is configured to form a distribution of plasma from the nonlinear medium so as to produce the diffractive optical element.

33. The system of Example 32, wherein the plasma has a light intensity dependent index of refraction.

34. The system of any one of Examples 32 to 33, wherein the interference pattern produces concentric circles of plasma.

35. The system of any one of Examples 32 to 34, wherein both the interference pattern and the plasma distribution comprise rings.

36. The system of any one of Examples 32 to 35, wherein the interference pattern and the plasma distribution have the same pattern.

37. The system of any one of Examples 1 to 36, wherein a thickness of the nonlinear medium is adjustable.

38. The system of any one of Examples 1 to 37, wherein the third laser beam has an energy flux less than the ionization threshold of the nonlinear medium.

39. The system of any one of Examples 1 to 37, wherein the third laser beam has an energy flux equal to or less than about 1/10 the ionization threshold of the nonlinear medium.

40. The system of any one of Examples 1 to 39, wherein the first and second laser beams comprise high intensity laser beams having an intensity of at least about at least about $10^{12}$ W/cm$^2$.

41. The system of any one of Examples 1 to 40, wherein the third laser beam comprises a high intensity beam having an intensity of at least about at least about $10^{12}$ W/cm$^2$.

42. The system of any one of Examples 1 to 41, further comprising a vacuum chamber.

43. A method for making a diffractive optical element, the method comprising:
   directing first and second pump laser beams to a nonlinear medium so that the first and second pump laser beams at least partially overlap each other in the nonlinear medium so that the first and second pump laser beams interfere to form an interference pattern at the nonlinear medium;
   wherein the interference pattern is configured to alter a characteristic of the nonlinear medium so as to produce a transmissive diffractive optical element.

44. The method of Example 43, further comprising directing a probe laser beam through the transmissive diffractive optical element to modify propagation of the probe laser beam.

45. The method of Example 44, wherein directing the probe laser beam through the transmissive diffractive optical element focuses the probe laser beam.

46. The method of Example 44, wherein directing the probe laser beam through the transmissive diffractive optical element collimates the probe laser beam.

47. The method of Example 44, wherein directing the probe laser beam through the transmissive diffractive optical element defocuses the probe laser beam.

48. The method of any one of Examples 43 to 47, wherein the diffractive optical element is a diffractive lens.

49. The method of any one of Examples 43 to 48, wherein the diffractive optical element is a zone plate.

50. The method of any one of Examples 43 to 49, wherein the diffractive optical element comprises plasma comprising ionize gas.

51. The method of any one of Examples 43 to 50, wherein the diffractive optical element is a plasma lens.

52. The method of any one of Examples 43 to 51, wherein the first and second pump laser beams are directed to the nonlinear material along collinear paths.

53. The method of any one of Examples 43 to 52, wherein the interference pattern alters the refractive index of the nonlinear material to produce the transmissive diffractive optical element.

54. The method of any one of Example 43 to 53, wherein the interference pattern forms a distribution of plasma from the nonlinear medium to produce the diffractive optical element.

55. A diffractive optical element comprising:
   a nonlinear material; and
   a plurality of concentric plasma rings formed in the nonlinear material.

56. The diffractive optical element of Example 55, wherein the diffractive optical element is transmissive.

57. The diffractive optical element of any one of Examples 55 to 56, wherein the diffractive optical element is a plasma lens.

58. The diffractive optical element of any one of Examples 55 to 57, wherein the nonlinear material comprises a gas.

59. The diffractive optical element of any one of Examples 55 to 58, wherein the concentric plasma rings are separated by regions of non-ionized gas.

60. The diffractive optical element of any one of Examples 55 to 59, wherein the index of refraction varies between the plasma and the nonlinear material.

61. The diffractive optical element of any one of Examples 55 to 60, wherein the diffractive optical element comprises a zone plate.

62. The system of any one of Examples 1-42, wherein the system comprises the supply configured to provide a nonlinear medium.

63. The system of any one of Examples 1-42, wherein the system comprises the support configured to hold a nonlinear medium.

Additional Information

In some embodiments, the methods, techniques, microprocessors, and/or controllers described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. The instructions can reside in RAM memory, flash memory, ROM memory, EPROM memory, EEPROM memory, registers, hard disk, a removable disk, a CD-ROM, or any other form of a non-transitory computer-readable storage medium. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

The microprocessors or controllers described herein can be coordinated by operating system software, such as iOS, Android, Chrome OS, Windows XP, Windows Vista, Windows 7, Windows 8, Windows 10, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

The microprocessors and/or controllers described herein may implement the techniques described herein using customized hard-wired logic, one or more ASICs or FPGAs, firmware and/or program logic which causes microprocessors and/or controllers to be a special-purpose machine. According to one embodiment, parts of the techniques disclosed herein are performed a controller in response to executing one or more sequences instructions contained in a memory. Such instructions may be read into the memory from another storage medium, such as storage device. Execution of the sequences of instructions contained in the memory causes the processor or controller to perform the process steps described herein. In alternative embodiments, hard-wired circuitry may be used in place of or in combination with software instructions.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the techniques described herein may be implemented in analog circuitry or mixed analog and digital circuitry.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected," as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a range of measurement error.

Although this disclosure contains certain embodiments and examples, it will be understood by those skilled in the art that the scope extends beyond the specifically disclosed embodiments to other alternative embodiments and/or uses and obvious modifications and equivalents thereof. In addition, while several variations of the embodiments have been shown and described in detail, other modifications will be readily apparent to those of skill in the art based upon this disclosure. It is also contemplated that various combinations or sub-combinations of the specific features and aspects of the embodiments may be made and still fall within the scope of this disclosure. It should be understood that various features and aspects of the disclosed embodiments can be combined with, or substituted for, one another in order to form varying modes of the embodiments. Any methods disclosed herein need not be performed in the order recited. Thus, it is intended that the scope should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Any headings used herein are for the convenience of the reader only and are not meant to limit the scope.

Further, while the devices, systems, and methods described herein may be susceptible to various modifications and alternative forms, specific examples thereof have been shown in the drawings and are herein described in detail. It should be understood, however, that the disclosure is not to be limited to the particular forms or methods disclosed, but, to the contrary, this disclosure covers all modifications, equivalents, and alternatives falling within the spirit and scope of the various implementations described. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including ambient temperature and pressure.

The following is claimed:

1. A system for making a plasma zone plate, the system comprising:
   at least one laser configured to provide first and second laser beams;
   at least one of: i) a nonlinear medium, ii) a supply configured to provide a nonlinear medium, and iii) a support configured to hold a nonlinear medium; and
   one or more optical elements configured to direct said first and second laser beams along substantially collinear paths in the same direction to said nonlinear medium with the first laser beam having a first focal length and the second laser beam having a second focal length that is different from the first focal length so that the first and second laser beams interfere and form an interference pattern on the nonlinear medium, wherein the one or more optical elements includes a focusing mirror configured to focus the first laser beam to have the first focal length, wherein the focusing mirror includes an aperture configured so that the second laser beam is directed through the aperture;
   wherein the interference pattern is configured to form a distribution of plasma from the nonlinear medium so as to produce a plasma zone plate that is configured to modify propagation of a third laser beam transmitted therethrough.

2. The system of claim 1, wherein the nonlinear medium comprises a gas jet.

3. The system of claim 1, wherein the third laser beam is not collinear with the first and second laser beams.

4. The system of claim 1, wherein the first laser beam, the second laser beam, and the third laser beam are collinear.

5. The system claim 1, wherein the first and second laser beams have the same wavelength.

6. The system of claim 1, wherein the interference pattern is configured to alter the index of refraction of the nonlinear medium.

7. The system of claim 1, wherein the plasma zone plate is configured to produce multiple diffractive orders.

8. The system of claim 1, wherein the plasma zone plate is configured to provide a single diffractive order.

9. The system of claim 1, wherein the plasma zone plate is configured to provide a negative diffractive order.

10. The system of claim 1, wherein the interference pattern produces concentric circles of plasma.

11. The system of claim 1, further comprising a vacuum chamber, wherein the system is configured to position the nonlinear medium inside the vacuum chamber.

12. The system of claim 1, wherein the one or more optical elements are configured to provide the first laser beam as a converging beam at the nonlinear medium and to provide the second laser beam as a converging beam at the nonlinear medium.

13. The system of claim 1, wherein the nonlinear medium is a non-ionized nonlinear medium and wherein the interference pattern is configured to produce spatially variant ionization to form the distribution of plasma from the nonlinear medium so as to produce the plasma zone plate.

14. The system of claim 1, wherein the plasma zone plate is configured to modify a focal length of the third laser beam transmitted therethrough.

15. A method for making a plasma zone plate, the method comprising:
   directing first and second pump laser beams along substantially collinear paths in the same direction to a nonlinear medium so that the first and second pump laser beams at least partially overlap each other in the nonlinear medium by focusing the first pump laser beam using a focusing mirror that includes an aperture; and directing the second pump laser through the aperture of the focusing mirror, wherein the first laser beam has a first focal length and the second laser beam has a second focal length different from the first focal length so that the first and second pump laser beams interfere to form an interference pattern at the nonlinear medium;
   wherein the interference pattern is configured to form a distribution of plasma from the nonlinear medium so as to produce a transmissive plasma zone plate that is configured to modify propagation of a probe laser beam transmitted through the plasma zone plate.

16. The method of claim 15, further comprising directing a probe laser beam through the transmissive plasma zone plate to modify the focal length of the probe laser beam.

17. The method of claim 15, wherein the interference pattern alters the refractive index of the nonlinear material to produce the transmissive plasma zone plate.

18. The method of claim 15, wherein the first and second pump laser beams have the same wavelength.

19. The method of claim 15, wherein the probe laser beam is not collinear with the first and second pump laser beams.

20. The method of claim 15, wherein the first pump laser beam, the second pump laser beam, and the probe laser beam are collinear.

21. The method of claim 15, wherein the first laser beam is a converging beam at the nonlinear medium, and wherein the second laser beam is a converging beam at the nonlinear medium.

22. The method of claim 15, wherein the nonlinear medium is a non-ionized nonlinear medium and wherein the interference pattern is configured to produce spatially variant ionization to form the distribution of plasma from the nonlinear medium so as to produce the transmissive plasma zone plate.

23. The method of claim 15, wherein the transmissive plasma zone plate is configured to modify a focal length of the probe laser beam transmitted through the plasma zone plate.

* * * * *